US012094639B2

(12) United States Patent
Wang et al.

(10) Patent No.: US 12,094,639 B2
(45) Date of Patent: Sep. 17, 2024

(54) COIL DEVICE

(71) Applicant: TDK CORPORATION, Tokyo (JP)

(72) Inventors: Chen Wang, Tokyo (JP); Satoshi Sugimoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 625 days.

(21) Appl. No.: 17/318,637

(22) Filed: May 12, 2021

(65) Prior Publication Data

US 2021/0358678 A1 Nov. 18, 2021

(30) Foreign Application Priority Data

May 14, 2020 (JP) ................................ 2020-085480
Aug. 17, 2020 (JP) ................................ 2020-137581

(51) Int. Cl.

| | |
|---|---|
| ***H01F 17/04*** | (2006.01) |
| ***H01F 27/24*** | (2006.01) |
| ***H01F 27/28*** | (2006.01) |
| ***H01F 27/32*** | (2006.01) |

(52) U.S. Cl.
CPC ......... *H01F 27/2823* (2013.01); *H01F 27/24* (2013.01); *H01F 27/32* (2013.01)

(58) Field of Classification Search
CPC .................................................. H01F 27/2823
USPC ......................................................... 336/221
See application file for complete search history.

(56) References Cited

U.S. PATENT DOCUMENTS

| | | | |
|---|---|---|---|
| 4,309,655 A * | 1/1982 | Lienhard .............. | G01R 15/185 336/212 |
| 6,765,468 B2 | 7/2004 | Chen et al. | |
| 7,248,139 B1 | 7/2007 | Podlisk et al. | |
| 11,004,592 B2 | 5/2021 | Bellur et al. | |
| 11,424,068 B2 | 8/2022 | Toyama et al. | |
| 11,437,184 B2 | 9/2022 | Mori et al. | |
| 11,587,717 B2 | 2/2023 | Wang et al. | |
| 2004/0160298 A1 | 8/2004 | Hsu et al. | |
| 2007/0176725 A1* | 8/2007 | Podlisk ............... | H01F 27/2847 336/212 |
| 2008/0169893 A1 | 7/2008 | Sullivan et al. | |
| 2017/0345545 A1* | 11/2017 | Liu ........................ | H05K 1/181 |
| 2018/0336986 A1* | 11/2018 | Xin ......................... | H01F 17/06 |
| 2019/0027288 A1 | 1/2019 | Sato et al. | |
| 2019/0237245 A1 | 8/2019 | Ashizawa et al. | |
| 2019/0272945 A1 | 9/2019 | Arai et al. | |

(Continued)

FOREIGN PATENT DOCUMENTS

| | | |
|---|---|---|
| CN | 205194485 U | 4/2016 |
| DE | 10 2019 215 525 A1 | 4/2021 |
| JP | 2004-87607 A | 3/2004 |

(Continued)

OTHER PUBLICATIONS

English translation of CN205194485 (Year: 2015).*

(Continued)

*Primary Examiner* — Ronald Hinson
(74) *Attorney, Agent, or Firm* — Oliff PLC

(57) ABSTRACT

A coil device includes a first conductor, a second conductor, and a core. The second conductor is disposed inside the first conductor and at least partly extending along the first conductor. The core internally arranges the first conductor and the second conductor. An insulating layer is formed at least between the first conductor and the second conductor.

14 Claims, 15 Drawing Sheets

(56) References Cited

U.S. PATENT DOCUMENTS

2020/0279688 A1* 9/2020 Toyama ................ H01F 27/027

FOREIGN PATENT DOCUMENTS

| | | | |
|---|---|---|---|
| JP | 2007-184509 | A | 7/2007 |
| JP | 2010-073523 | A | 4/2010 |
| JP | 2019-129253 | A | 8/2019 |
| JP | 2019-134147 | A | 8/2019 |
| JP | 2020-145414 | A | 9/2020 |
| TW | 677887 | B | 11/2019 |
| TW | M585974 | U | 11/2019 |
| TW | I690953 | B | 4/2020 |
| WO | 92/17892 | A1 | 10/1992 |
| WO | 2019/119046 | A1 | 6/2019 |

OTHER PUBLICATIONS

Dec. 20, 2023 Notice of Allowance issued in U.S. Appl. No. 17/404,146.
Sep. 14, 2023 Office Action issued in U.S. Appl. No. 17/318,358.
Sep. 1, 2023 Office Action issued in U.S. Appl. No. 17/404,146.
Apr. 11, 2024 Office Action issued in U.S. Appl. No. 17/318,358.

* cited by examiner

COIL DEVICE

BACKGROUND OF THE INVENTION

The present invention relates to a coil device used as, for example, an inductor.

As a coil device used as an inductor or so, for example, a coil device described in Patent Document 1 is known. The coil device described in Patent Document 1 includes two conductors and a core for internally arranging the two conductors. In the coil device described in Patent Document 1, the magnetic coupling between the two conductors is increased by forming a region in which no magnetic material is disposed between the two conductors.

In the coil device described in Patent Document 1, however, it is difficult to sufficiently increase the magnetic coupling between the two conductors due to the configuration, and required is a technique that can sufficiently increase the magnetic coupling between the two conductors.

Patent Document 1: JP2007184509 (A)

BRIEF SUMMARY OF INVENTION

The present invention has been achieved under such circumstances. It is an object of the invention to provide a coil device having a sufficiently large magnetic coupling.

To achieve the above object, a coil device according to the present invention comprises:

a first conductor;

a second conductor disposed inside the first conductor and at least partly extending along the first conductor; and a core for internally arranging the first conductor and the second conductor, wherein an insulating layer is formed at least between the first conductor and the second conductor.

The coil device according to the present invention includes a first conductor and a second conductor disposed inside the first conductor and at least partly extending along the first conductor, and an insulating layer is formed at least between the first conductor and the second conductor. In this case, the first conductor and the second conductor are arranged while overlapping with each other (double) with a predetermined interval. Under such an arrangement, the magnetic flux can efficiently be transmitted between the first conductor and the second conductor, and the magnetic coupling between the first conductor and the second conductor can be increased sufficiently. In addition, since the first conductor and the second conductor are sufficiently insulated via the insulating layer existing therebetween, it is possible to prevent a short-circuit failure generated between the first conductor and the second conductor, and the coil device can have a high reliability.

Preferably, the second conductor is made of a flat wire, and the insulating layer is made of an insulating film formed on a surface of the second conductor. When a flat wire with an insulating film is used as the second conductor, the insulating layer can exist between the first conductor and the second conductor by simply disposing the second conductor inside the first conductor in an overlapping manner, and the above-mentioned effect can be obtained easily.

Preferably, the first conductor and the second conductor are adhered via a fusion layer formed by fusing the insulating layer formed on a surface of the second conductor. In this structure, the insulating layer made of the fusion layer can be filled in the space between the first conductor and the second conductor without gaps, and the first conductor and the second conductor can be insulated sufficiently.

Preferably, the insulating layer is formed between the core and the first conductor or the second conductor. In this structure, since the core and the first or second conductor are sufficiently insulated via the insulating layer existing therebetween, it is possible to prevent a short-circuit failure generated between the core and the first or second conductor, and the coil device can have a high reliability.

Preferably, the first conductor is made of a conductive plate with a plating layer formed on a surface of the conductive plate. In this structure, a connection member, such as solder and conductive adhesive agent, easily adheres to the surface of the first conductor, and the first conductor can firmly be connected to a mounting surface of a mounting board. In particular, when the connection member is solder, a solder fillet can easily be formed on the side surface of the first conductor, and the first conductor and the mounting surface of the mounting board can thereby firmly be connected.

Preferably, the second conductor includes a mount facing surface capable of facing a mounting surface, the mount facing surface consists of a joinable surface not including the insulating layer and a non-joinable surface including the insulating layer, and the non-joinable surface is located closer to the first conductor than the joinable surface. In this case, the above-mentioned connection member easily adheres to the joinable surface, but does not easily adhere to the non-joinable surface. Thus, the non-joinable surface can prevent the connection member adhered to the joinable surface from protruding toward the first conductor, and it is possible to effectively prevent a short-circuit failure generated between the first conductor and the second conductor.

Preferably, the joinable surface includes a standing part standing from the mounting surface. In this structure, the connection member can be attached not only to an opposite surface to the mounting surface of the mounting board, but also to the standing part of the mounting part. Thus, when the connection member is solder, a solder fillet can be formed on the standing part of the joinable surface, and the second conductor can firmly be connected to the mounting surface of the mounting board. In the above-mentioned structure, it is possible to prevent formation of, for example, solder balls on the mounting part of the second conductor.

Preferably, an outer bending part bending outward is provided at an end of the first conductor, an inner bending part bending inward is provided at an end of the second conductor, and a radius of curvature of an inner surface of the outer bending part is larger than that of an outer surface of the inner bending part. In this case, a bending angle of the inner surface of the outer bending part (the inner surface of the first conductor at the position of the outer bending part) is smaller than that of the outer surface of the inner bending part (the outer surface of the second conductor at the position of the inner bending part). Thus, the outer surface of the inner bending part bends sharply near the mounting surface of the mounting board, but the inner surface of the outer bending part bends gently from a position away from the mounting surface of the mounting board. Thus, a comparatively large space is formed between the inner surface of the outer bending part and the outer surface of the inner bending part, and it is possible to effectively prevent a short-circuit failure generated between the first conductor and the second conductor in the surroundings of the mounting surface of the mounting board.

Preferably, a cross-sectional area of the first conductor perpendicular to its extending direction is larger than that of the second conductor perpendicular to its extending direction. In this structure, the DC resistance of the first conductor can be smaller than that of the second conductor.

Preferably, a bottom surface of the core is disposed away from a mounting surface. In this structure, it is possible to sufficiently secure the insulation between the bottom surface of the core and the mounting surface of the mounting board. In particularly, when the core is made of a metal magnetic material or so, it is possible to effectively prevent a short-circuit failure generated between the bottom surface of the core and the mounting surface of the mounting board.

Preferably, an insulating coating layer is provided at least on a bottom surface of the core. In this structure, the insulating coating layer can sufficiently insulate between the bottom surface of the core and the second conductor (or the first conductor) and between the bottom surface of the core and the mounting surface of the mounting board.

Preferably, a mounting part of the first conductor and a mounting part of the second conductor are insulated by a resin spacer. In this structure, it is possible to effectively prevent a short-circuit failure generated between the first mounting part and the second mounting part.

DETAILED DESCRIPTION OF INVENTION

Hereinafter, the present invention is explained based on embodiments shown in the figures.

First Embodiment

Figure 1A:
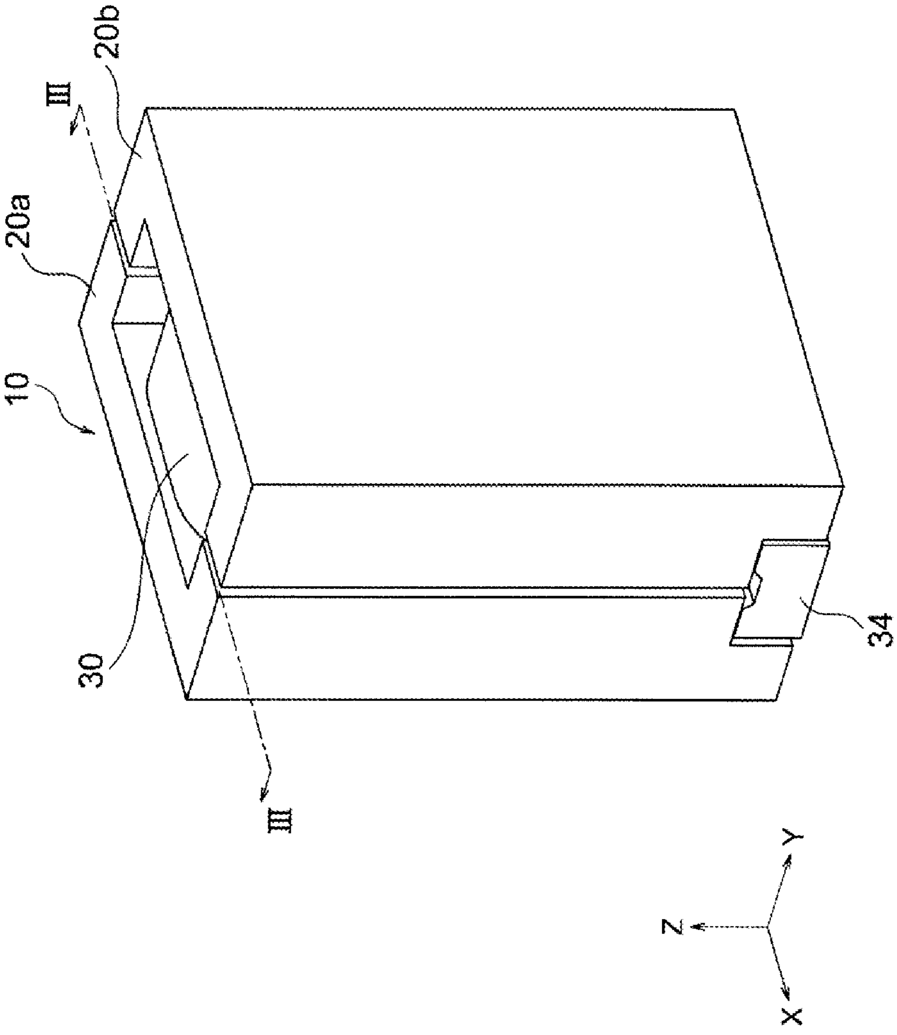
FIG. 1A is a perspective view of a coil device according to First Embodiment of the present invention.

As shown in FIG. 1A, a coil device 10 according to First Embodiment of the present invention has a substantially rectangular parallelepiped shape and functions as a combined coil used for power supply circuits or so. Preferably, the coil device 10 has a width of 3.0-20.0 mm in the X-axis direction, a width of 3.0-20.0 mm in the Y-axis direction, and a width of 3.0-20.0 mm in the Z-axis direction.

Figure 2:
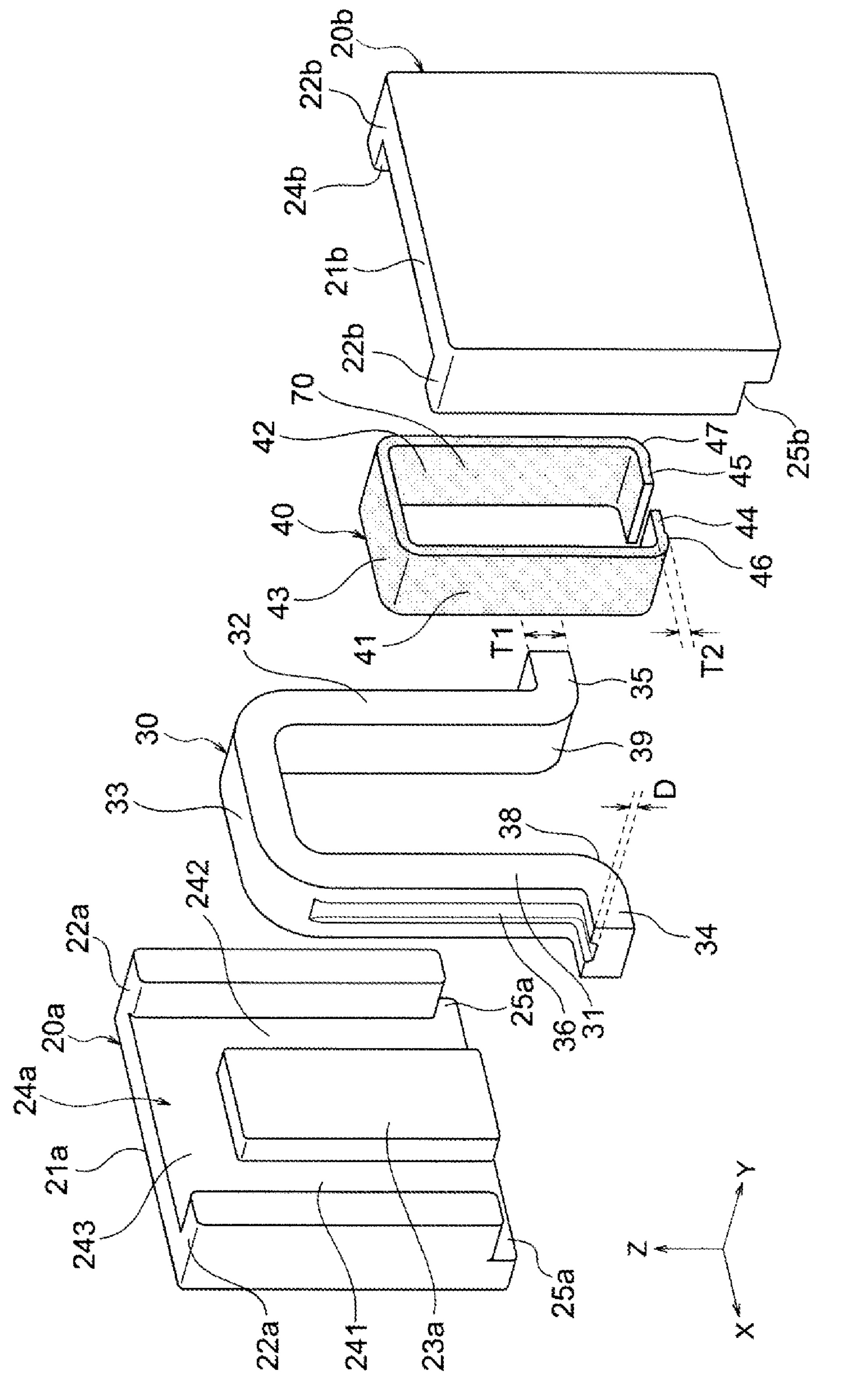
FIG. 2 is an exploded perspective view of the coil device shown in FIG. 1A.

As shown in FIG. 2, the coil device 10 includes a first core 20*a*, a second core 20*b*, a first conductor 30, and a second conductor 40. Either one of the conductors 30 and 40 functions as a primary coil, and the other one of the conductors 30 and 40 functions as a secondary coil. The details of the conductors 30 and 40 are explained below.

The first core 20*a* and the second core 20*b* have the same shape and have what is called an E shape. The first core 20*a* and the second core 20*b* are arranged to face each other in the Y-axis direction and are joined with adhesive agent or so. The first core 20*a* and the second core 20*b* are made of magnetic material and are manufactured by molding and sintering, for example, a magnetic material having a comparatively high permeability, such as Ni—Zn based ferrite and Mn—Zn based ferrite, or a magnetic powder made of metal magnetic material.

The first core 20*a* includes a first base 21*a*, a pair of first outer legs 22*a* and 22*a*, a first middle leg 23*a* disposed between the pair of first outer legs 22*a* and 22*a*, a first groove 24*a*, and first side grooves 25*a* and 25*a*. The first base 21*a* has a substantially flat plate shape (substantially rectangular parallelepiped shape).

The pair of first outer legs 22*a* and 22*a* is formed at one end and the other end of the first base 21*a* in the X-axis direction with a predetermined interval in the X-axis direction. The first outer legs 22*a* and 22*a* protrude from one surface of the first base 21*a* in the Y-axis direction toward one side in the Y-axis direction by a predetermined length. The first outer legs 22*a* and 22*a* have an elongated shape in the Z-axis direction and extend from the upper end to the lower end of the first base 21*a* in the Z-axis direction.

The first middle leg 23*a* is formed at an approximately central part of the first base 21*a* in the X-axis direction. The first middle leg 23*a* protrudes from one surface of the first base 21*a* in the Y-axis direction toward one side in the Y-axis direction by a predetermined length. The first middle leg 23*a* has an elongated shape in the Z-axis direction and extends from an upper point to the lower end of the first base 21*a* in the Z-axis direction. The protrusion width of the first middle leg 23*a* in the Y-axis direction is substantially equal to that of the first outer legs 22*a* and 22*a* in the Y-axis direction. In the illustrated example, the width of the first middle leg 23*a* in the X-axis direction is larger than that of the first outer leg 22*a* (22*a*) in the X-axis direction and is approximately 2-3 times as large as that of the first outer leg 22*a* (22*a*) in the X-axis direction.

Figure 3:
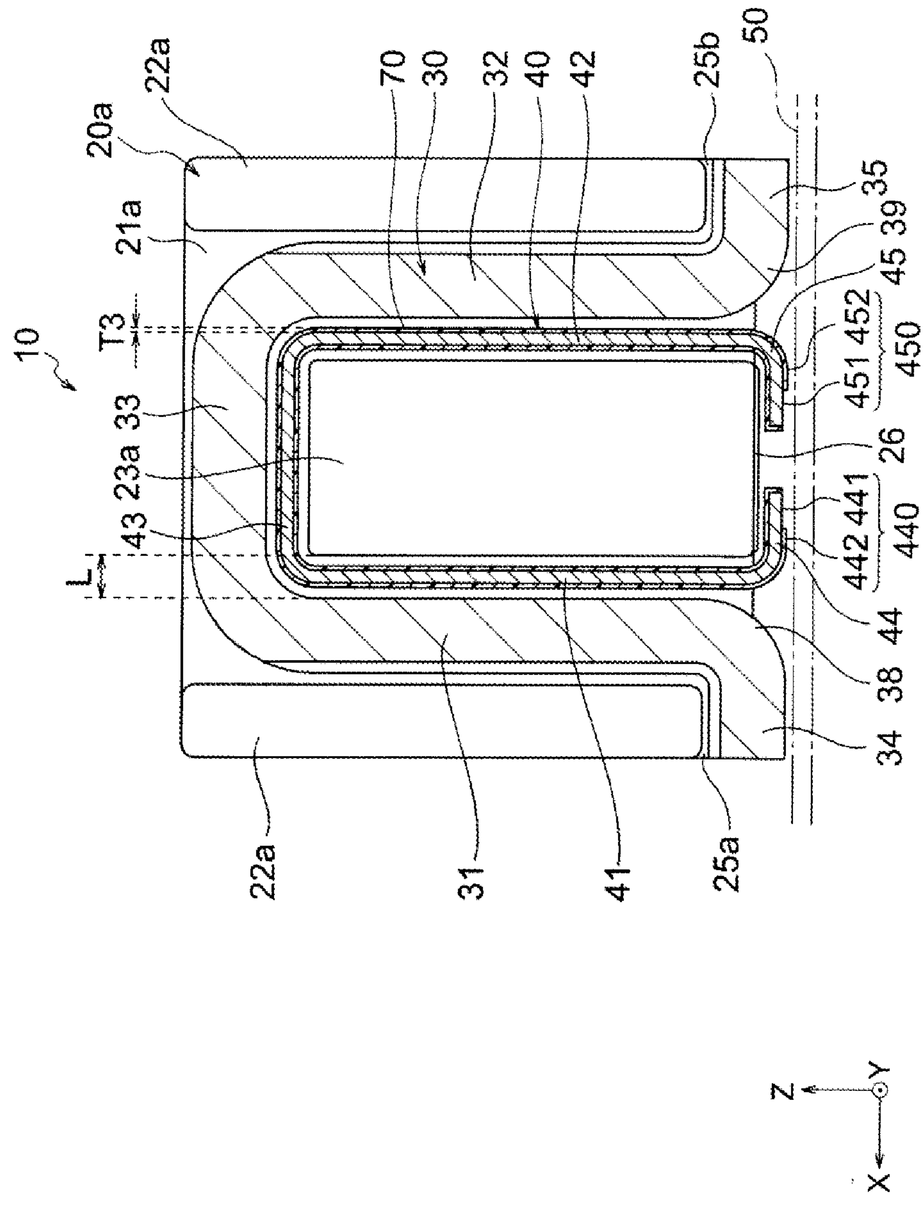
FIG. 3 is a cross-sectional view of the coil device shown in FIG. 1A along the III-III line.

As shown in FIG. 3, an insulating coating is applied to a surface of the first middle leg 23*a* opposite to a mounting surface 50 of a mounting board, and an insulating coating layer 26 is formed on this surface. The insulating coating layer 26 is made of a resin-based material, such as epoxy resin and urethane resin. Preferably, the insulating coating layer 26 has a thickness of 1-200 μm. Incidentally, the insulating coating layer 26 is similarly formed on the bottom surface of the second middle leg 23*b* of the second core 20*b*.

As shown in FIG. 2, the first groove 24*a* has a shape corresponding to that of the first conductor 30 (approximately U shape) and extends along the circumference of the first middle leg 23*a*. The conductor 30 and the second conductor 40 can be arranged while overlapping with each other in the first groove 24*a*. The first groove 24*a* includes a first side part 241, a second side part 242, and an upper part 243.

The first side part 241 and the second side part 242 extend substantially linearly in the Z-axis direction from the upper end to the lower end of the first base 21*a* in the Z-axis direction. The first side part 241 is formed between the first outer leg 22*a* located on one side in the X-axis direction and the first middle leg 23*a*, and the second side part 242 is formed between the first outer leg 22*a* located on the other side in the X-axis direction and the first middle leg 23*a*. The width of the side part 241 (242) in the X-axis direction is larger than the sum of thicknesses (plate thicknesses) of the conductors 30 and 40. As mentioned below, conductor side parts 31 and 41 of the conductors 30 and 40 are arranged in the first side part 241, and conductor side parts 32 and 42 of the conductors 30 and 40 are arranged in the second side part 242.

The upper part 243 is formed in an upper part of the first base 21*a* and extends in the X-axis direction. The upper part 243 connects the upper end of the first side part 241 and the upper end of the second side part 242. The width of the upper part 243 in the Z-axis direction is larger than the sum of thicknesses (plate thicknesses) of the conductors 30 and 40. As mentioned below, conductor upper parts 33 and 44 of the conductors 30 and 40 are arranged in the upper part 243.

The pair of first side grooves 25*a* and 25*a* is formed below the first outer legs 22*a* and 22*a* located on one side and the other side in the X-axis direction and extends in the X-axis direction toward one end and the other end of the first base 21*a* in the X-axis direction. The first side groove 25*a* (25*a*) is connected to the lower end of the side part 241 (242) and is a substantially L-shaped groove formed by the side part 241 (242) and the first side groove 25*a* (25*a*). The width of the first side groove 25*a* (25*a*) in the Z-axis direction is as large as or larger than the thickness (plate thickness) of the first conductor 30. As mentioned below, mounting parts 34 and 35 of the first conductor 30 are arranged in the first side grooves 25*a* and 25*a*.

The second core 20*b* includes a second base 21*b*, a pair of second outer legs 22*b* and 22*b*, a second middle leg 23*b* (FIG. 1B) disposed between the pair of second outer legs 22*b* and 22*b*, a second groove 24*b*, and second side grooves 25*b* and 25*b*. The second outer legs 22*b* and 22*b* are arranged opposite to the first outer legs 22*a* and 22*a*, and the second middle leg 23*b* is disposed opposite to the first middle leg 23*a*. The shape of the second core 20*b* is similar to that of the first core 20*a*. Thus, the shape of each part of the second core 20*b* is not explained.

Figure 1B:
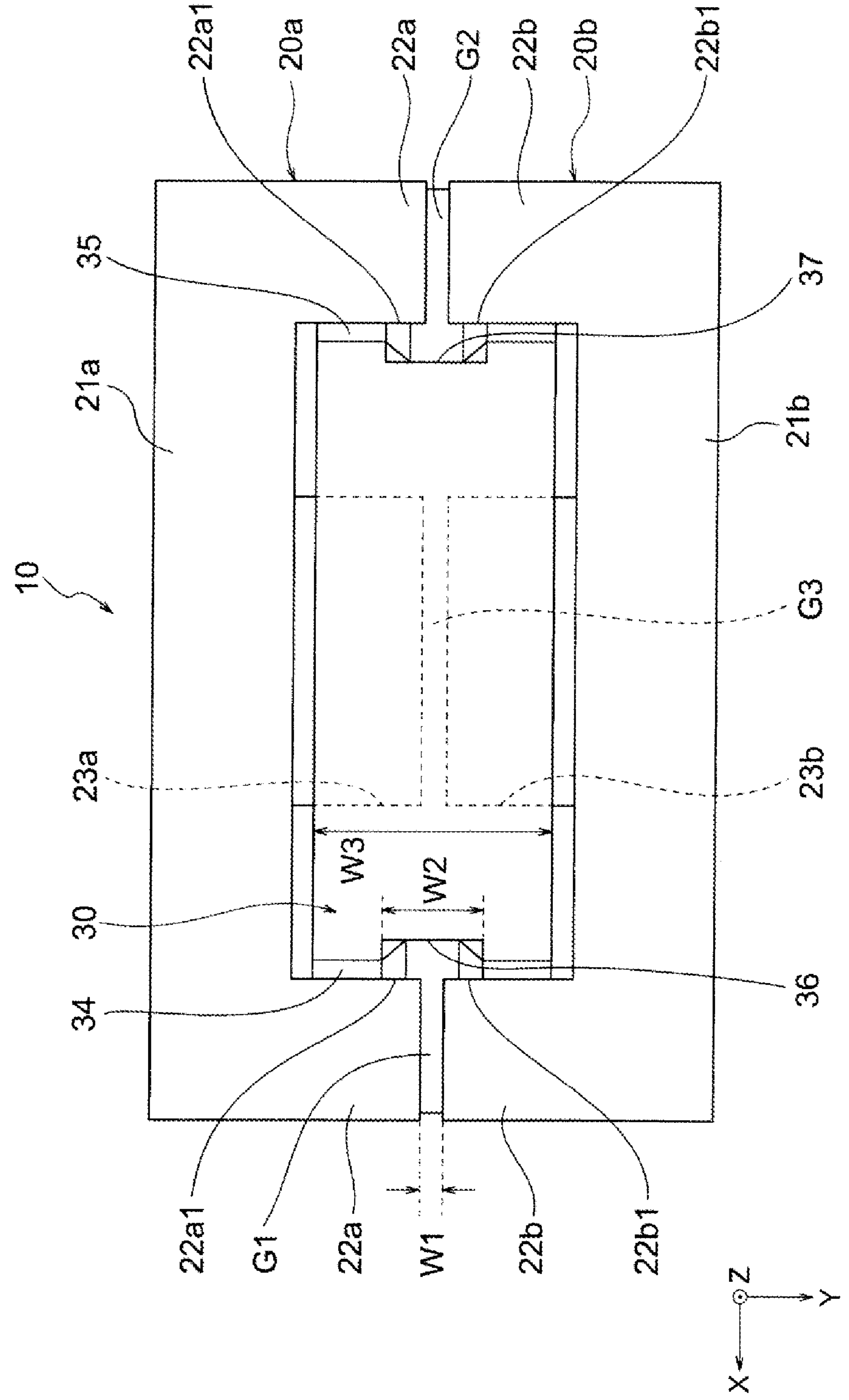
FIG. 1B is a plane view of the coil device shown in FIG. 1A.

As shown in FIG. 1B, the first core 20*a* and the second core 20*b* can be combined by joining one surface of the first core 20*a* located opposite to the first base 21*a* in the Y-axis direction and one surface of the second core 20*b* located opposite to the second base 21*b* in the Y-axis direction via adhesive agent or so (not illustrated). For more detail, the outer legs 22*a* and 22*b* and/or the middle legs 23*a* and 23*b* of the cores 20*a* and 20*b* are joined.

When the first core 20*a* and the second core 20*b* are combined while facing each other in the Y-axis direction, gaps G1 and G2 each having a predetermined width in the Y-axis direction are formed between the first core 20*a* and the second core 20*b* at a position where the outer legs 22*a* and 22*b* are formed, and a gap G3 having a predetermined width in the Y-axis direction is formed at a position where the middle legs 23*a* and 23*b* are formed.

The gap G1 has a predetermined length in the X-axis direction and is formed between the outer legs 22*a* and 22*b* located on one side in the X-axis direction. The gap G2 has a predetermined length in the X-axis direction and is formed between the outer legs 22*a* and 22*b* located on the other side in the X-axis direction. The length of the gap G1 (G2) in the X-axis direction is equal to that of the outer leg 22*a* (22*b*) in the X-axis direction. The gap G1 (G2) also has a predetermined length in the Z-axis direction, and this length is equal to that of the outer leg 22*a* (22*b*) in the Z-axis direction.

The gap G3 has a predetermined length in the X-axis direction and is formed between the first middle leg 23*a* and the second middle leg 23*b*. The length of the gap G3 in the X-axis direction is equal to that of the middle leg 23*a* (23*b*) in the X-axis direction. In the illustrated example, the length of the gap G3 in the X-axis direction is larger than that of the gap G1 (G2) in the X-axis direction. The gap G3 also has a predetermined length in the Z-axis direction, and this length is equal to that of the first middle leg 23*a* (23*b*) in the Z-axis direction. The gaps G1-G3 are formed on the same line along the boundary between the first core 20*a* and the second core 20*b*.

The width W1 of the gap G1 in the Y-axis direction is preferably 0.1-1.0 mm, more preferably 0.1-0.5 mm. This is also the case with the gap G2 and the gap G3 in the Y-axis direction. Incidentally, the gaps G1-G3 may have mutually different widths in the Y-axis direction.

As shown in FIG. 2, the first conductor 30 is made of a conductive plate and has a curved shape (approximately U shape). The first conductor 30 is disposed between the first core 20*a* and the second core 20*b* together with the second conductor 40. The first conductor 30 is made of, for example, a good metal conductor, such as copper, copper alloy, silver, and nickel, but may be any conductive material. The first conductor 30 is manufactured by, for example, machining a metal plate, but may be manufactured by any other method.

In the illustrated example, the first conductor 30 has a vertically long shape as a whole, and the height of the first conductor 30 in the Z-axis direction is larger than the length of the first conductor 30 in the X-axis direction. The cross-sectional area of the first conductor 30 perpendicular to its extending direction is larger than that of the second conductor 40 perpendicular to its extending direction. The thickness (plate thickness) of the first conductor 30 is larger than that (plate thickness) of the second conductor 40. Preferably, the first conductor 30 has a thickness of 0.5-2.5 mm, and the second conductor 40 has a thickness of 0.1-1 mm. The first conductor 30 may be as wide as the second conductor 40 in the Y-axis direction.

A plating layer is formed on the entire surface of the first conductor 30. The plating layer is composed of a single layer or a plurality of layers and is composed of, for example, a metal plating layer, such as Cu plating, Ni plating, Sn plating, Ni—Sn plating, Cu—Ni—Sn plating, Ni—Au plating, and Au plating. The plating layer is formed by, for example, applying an electric field plating or an electroless field plating to the surface of the first conductor 30. The plating layer may have any thickness, but preferably has a thickness of 1-30 μm.

The first conductor 30 includes a first conductor side part 31, a second conductor side part 32, a conductor upper part 33, a first mounting part 34, and a second mounting part 35. The first conductor side part 31 and the second conductor side part 32 extend in the Z-axis direction. In the first conductor 30, the first conductor side part 31 side functions as an input terminal (or an output terminal), and the second conductor side part 32 side functions as an output terminal (or an input terminal). The conductor upper part 33 extends in the X-axis direction and connects the first conductor side part 31 and the second conductor side part 32.

The first mounting part 34 and the second mounting part 35 are formed at one end and the other end of the conductor 30, respectively. That is, the mounting part 34 (35) is formed continuously (integrally) to the lower end of the conductor side part 31 (32). The mounting part 34 (35) is bent substantially perpendicularly to the conductor side part 31 (32) and extends outward in the X-axis direction. The first conductor 30 can be connected to the mounting surface 50 (FIG. 3) of the mounting board via the mounting parts 34 and 35. The first conductor 30 is connected to the mounting surface 50 using a connection member, such as solder and conductive adhesive agent.

As shown in FIG. 1A, the end (end surface) of the mounting part 34 (35) is exposed outward from the sides of the cores 20*a* and 20*b* in the X-axis direction. Likewise, as shown in FIG. 3, the lower surface of the mounting part 34 (35) is exposed outward from the bottom of the core 20*a* (20*b*). Since the mounting parts 34 and 35 are exposed in such a manner, the heat generated in the surroundings of the mounting parts 34 and 35 can efficiently be released to the outside of the cores 20*a* and 20*b*.

A first outer bending part 38 bending outward in the X-axis direction (opposite to the second conductor 40 side) is formed near the boundary between the first conductor side part 31 and the first mounting part 34, and a second outer bending part 39 bending outward in the X-axis direction is formed near the boundary between the second conductor side part 32 and the second mounting part 35.

In the present embodiment, as shown in FIG. 1B and FIG. 2, a first outer notch 36 and a second outer notch 37 are formed on the outer surface of the first conductor 30. The first outer notch 36 is formed on the front surfaces of the first conductor side part 31 and the first mounting part 34 and extends in the extending direction (longitudinal direction) of the first conductor side part 31 and the first mounting part 34. The first outer notch 36 is made of a concave groove, and taper surfaces are formed on the inside of the concave groove. The shape of the first outer notch 36 is the same as that of the first conductor side part 31 and the first mounting part 34 and is an approximately L shape. The first outer notch 36 is formed at an approximately central part of the first conductor side part 31 and the first mounting part 34 in the Y-axis direction and continuously extends from the upper end of the first conductor side part 31 to the end of the first mounting part 34.

The second outer notch 37 is formed on the front surfaces of the second conductor side part 32 and the second mounting part 35 and extends in the extending direction (longitudinal direction) of the second conductor side part 32 and the second mounting part 35. The second outer notch 37 is made of a concave groove, and taper surfaces are formed on the inside of the concave groove. The shape of the second outer notch 37 is the same as that of the second conductor side part 32 and the second mounting part 35 and is an approximately L shape. The second outer notch 37 is formed at an approximately central part of the second conductor side part 32 and the second mounting part 35 in the Y-axis direction and continuously extends from the upper end of the second conductor side part 32 to the end of the second mounting part 35.

The outer notch 36 (37) is formed on the first conductor 30 at a position corresponding to the gap G1 (G2) (a position close to the gap G1 (G2)). For more detail, the outer notch 36 (37) is formed on the conductor side part 31 (32) so as to extend in the Z-axis direction along an outer leg edge 22*a*1 (22*b*1) of the outer leg 22*a* (22*b*) next to the first conductor 30, and the outer notch 36 (37) is formed on the mounting part 34 (35) so as to extend in the X-axis direction along the lower end of the outer leg 22*a* (22*b*).

The first outer notch 36 is opposite to (faces) the other end of the gap G1 in the X-axis direction. At the position corresponding to the gap G1, the surface of the first conductor 30 and the other end of the gap G1 in the X-axis direction are away from each other by a distance corresponding to the depth D of the first outer notch 36. The second outer notch 37 is opposite to (faces) one end of the gap G2 in the X-axis direction. At the position corresponding to the gap G2, the surface of the first conductor 30 and one end of the gap G2 in the X-axis direction are away from each other by a distance corresponding to the depth of the second outer notch 37.

The width of the outer notch 36 (37) in the Y-axis direction is larger than that of the gap G1 (G2) in the Y-axis direction. The ratio W2/W1 of the width W2 of the first outer notch 36 in the Y-axis direction to the width W1 of the gap G1 in the Y-axis direction is preferably 0.5-10, more preferably 1-7, still more preferably 3-5. This is also the case with the ratio of the width of the second outer notch 37 in the Y-axis direction to the width of the gap G2 in the Y-axis direction.

The ratio W2/W3 of the width W2 of the first outer notch 36 in the Y-axis direction to the width W3 of the first conductor 30 in the Y-axis direction is preferably 0.2-0.8, more preferably 0.3-0.5. This is also the case with the ratio of the width of the second outer notch 37 in the Y-axis direction to the width of the first conductor 30 in the Y-axis direction.

The ratio D/T1 of the depth D of the first outer notch 36 to the thickness T1 of the first conductor 30 is preferably 0.1-0.5, more preferably 0.2-0.4. This is also the case with the ratio of the depth of the second outer notch 37 to the thickness T1 of the first conductor 30.

Preferably, the relation between the depth D of the first outer notch 36 and the width W1 of the gap G1 in the Y-axis direction satisfies D>W1, but may not satisfy this. The ratio D/W1 of the depth D to the width W1 is preferably 0.5-5, more preferably 1-3. This is also the case with the relation between the depth of the second outer notch 37 and the width of the gap G2 in the Y-axis direction.

In the present embodiment, at the position corresponding to the gaps G1 and G2, the leakage magnetic flux generated in the gaps G1 and G2 can be prevented from hitting the conductor side parts 31 and 32 and the mounting parts 34 and 35 by determining each value of W2/W1, W2/W3, D/T1, and D/W1 or satisfying D>W1.

As shown in FIG. 2, the second conductor 40 is formed of a flat wire and has a curved shape (substantially U shape). The second conductor 40 can be made of the same material as the first conductor 30. The second conductor 40 is disposed inside the cores 20*a* and 20*b* (inside the grooves 24*a* and 24*b*) together with the first conductor 30. When the conductors 30 and 40 are arranged inside the groove 24*a* and 24*b*, the second conductor 40 is disposed inside the first conductor 30 at a predetermined interval, the middle legs 23*a* and 23*b* are arranged inside the second conductor 40, and the outer legs 22*a* and 22*b* are arranged outside the first conductor 30.

In the illustrated example, the second conductor 40 has a vertically long shape, and the height of the second conductor 40 in the Z-axis direction is larger than the length of the second conductor 40 in the X-axis direction. The second conductor 40 is smaller than the first conductor 30 and is surrounded by the first conductor 30 at the time of disposing the second conductor 40.

The second conductor 40 includes a first conductor side part 41, a second conductor side part 42, a conductor upper part 43, a first mounting part 44, and a second mounting part 45. The first conductor side part 41 and the second conductor side part 42 extend in the Z-axis direction and are arranged opposite to each other in the X-axis direction. In the second conductor 40, the first conductor side part 41 side functions as an input terminal (or an output terminal), and the second conductor side part 42 side functions as an output terminal (or an input terminal).

The first conductor side part 41 of the second conductor 40 extends substantially in parallel to the first conductor side part 31 of the first conductor 30, and the second conductor side part 42 of the second conductor 40 extends substantially in parallel to the second conductor side part 32 of the first conductor 30.

The conductor upper part 43 extends in the X-axis direction and connects the upper ends of the first conductor side part 41 and the second conductor side part 42. The conductor upper part 43 of the second conductor 40 extends substantially in parallel to the conductor upper part 33 of the first conductor 30.

The first mounting part 44 and the second mounting part 45 are formed at one end and the other end of the second conductor 40, respectively. That is, the mounting part 44 (45) is formed continuously (integrally) to the lower end of the conductor side part 41 (42).

The mounting part 44 (45) is bent substantially perpendicularly to the conductor side part 41 (42) and extends inward in the X-axis direction. As shown in FIG. 3, the mounting part 44 (45) extends along the bottom surface of the middle leg 23*a* (23*b*), and a predetermined space is formed between the upper surface of the mounting part 44 (45) and the bottom surface of the middle leg 23*a* (23*b*). As mentioned above, since the insulating coating layer 26 is formed on the bottom surface of the middle leg 23*a* (23*b*), the middle leg 23*a* (23*b*) and the mounting part 44 (45) are insulated favorably.

The extending direction of the first mounting part 44 of the second conductor 40 is opposite to that of the first mounting part 34 of the first conductor 30 in the X-axis direction. The extending direction of the second mounting part 45 of the second conductor 40 is opposite to that of the second mounting part 35 of the first conductor 30 in the X-axis direction.

The second conductor 40 can be connected to the mounting surface 50 of the mounting board via the mounting parts 44 and 45. The second conductor 40 is connected to the mounting surface 50 via a connection member, such as solder and conductive adhesive agent.

The lower surfaces of the mounting parts 44 and 45 are exposed outward from the bottom of the cores 20*a* and 20*b*. Since the mounting parts 44 and 45 are exposed in such a manner, the heat generated in the surroundings of the mounting parts 44 and 45 can efficiently be released to the outside of the cores 20*a* and 20*b*.

The mounting part 44 (45) includes a mount facing surface 440 (450) capable of facing the mounting surface 50 of the mounting board. The mount facing surface 440 (450) is a surface for connecting to the mounting surface 50. The details of the mount facing surface 440 (450) are mentioned below.

An insulating layer 70 is formed between the first conductor 30 and the second conductor 40. The insulating layer 70 exists between the first conductor 30 and the second conductor 40 and favorably insulates the first conductor 30 and the second conductor 40. The insulating layer 70 according to the present embodiment is made of an insulating film formed on the surface of the second conductor 40 and is formed integrally with the second conductor 40. In the illustrated example, the surface (outer surface) of the insulating layer 70 is not contacted with the inner surface of the first conductor 30, and a space is formed between the outer surface of the insulating layer 70 and the inner surface of the first conductor 30.

Various modes of the insulating layer 70 can be considered. For example, the insulating layer 70 may be a fusion layer formed by fusing an insulating film on the surface of the second conductor 40. In this case, the inner surface of the first conductor 30 and the outer surface of the second conductor 40 are connected via a fusion layer (insulating layer 70), and the insulating layer 70 can be filled in the space between the first conductor 30 and the second conductor 40 without gaps, and the first conductor 30 and the second conductor 40 can be insulated sufficiently. When the first conductor 30 and the second conductor 40 are connected via the insulating layer 70, the magnetic coupling between the first conductor 30 and the second conductor 40 can be enhanced.

The fusion layer can be formed by heating the insulating film formed on the surface of the second conductor 40. Incidentally, the fusion layer may be formed separately from the insulating film formed on the surface of the second conductor 40. For example, the insulating film and the fusion layer may be formed as two layers on the surface of the second conductor 40.

For example, the insulating layer 70 may be made of a resin body, such as resin spacer, formed separately from the second conductor 40. In this case, when the resin body has a bent shape corresponding to the shape (substantially U shape) of the space between the first conductor 30 and the second conductor 40, the insulating layer 70 can be formed along the outer surface of the second conductor 40 and the inner surface of the first conductor 30.

As shown in FIG. 2, the insulating layer 70 covers the entire surface of the second conductor 40 (excluding joinable surfaces 441 and 451 of the mount facing surfaces 440 and 450 mentioned below). The range in which the insulating layer 70 is formed is not limited to one shown in the figure. The insulating layer 70 is formed at a position where at least the inner surface of the first conductor 30 and the outer surface of the second conductor 40 face each other.

As shown in FIG. 3, when the distance between the inner surface of the first conductor 30 and the outer surface of the second conductor 40 is L, the thickness T3 of the insulating layer 70 is appropriately determined within the range of $0<T3\leq L$. For example, when the insulating layer 70 is made of an insulating film formed on the surface of the second conductor 40, the thickness of the insulating film is preferably 1-200 μm, more preferably 1-100 μm. For example, when the insulating layer 70 is made of the above-mentioned resin body formed separately from the second conductor 40, the insulating layer 70 may have a thickness that is larger than the above-mentioned one.

The insulating layer 70 may be made of any material, such as polyester, polyesterimide, polyamide, polyamideimide, polyurethane, epoxy, and epoxy-modified acrylic resin.

The insulating layer 70 entirely covers the outer surfaces, the inner surfaces, and the side surfaces perpendicular to them of the conductor side parts 41 and 42 and the conductor upper part 43. Since the insulating layer 70 is formed on the inner surfaces of the conductor side parts 41 and 42 and the conductor upper part 43, the second conductor 40 and the middle legs 23*a* and 23*b* of the cores 20*a* and 20*b* can be insulated favorably.

Between the second conductor 40 and the middle legs 23*a* and 23*b* of the cores 20*a* and 20*b*, the insulating layer 70 is formed integrally with the second conductor 40 and extends along the inner surface of the second conductor 40 (the conductor side parts 41 and 42 and the conductor upper part 43). Incidentally, the mode of the insulating layer 70 formed between the second conductor 40 and the middle legs 23*a* and 23*b* of the cores 20*a* and 20*b* is similar to that of the insulating layer 70 formed between the first conductor 30 and the second conductor 40 mentioned above.

The insulating layer 70 entirely covers the inner surfaces, the side surfaces, and the end surfaces (each end surface of the second conductor 40) of the mounting parts 44 and 45, but simply partly covers the outer surfaces (mount facing surfaces 440 and 450) of the mounting parts 44 and 45.

For more detail, the mount facing surface 440 (450) includes a joinable surface 441 (451), on which the insulating layer 70 is not formed, and a non-joinable surface 442 (452), on which the insulating layer 70 is formed. Since the insulating layer 70 is not formed on the joinable surface 441 (451), the joinable surface 441 (451) has conductivity, and the joinable surfaces 441 and 451 and the mounting surface 50 of the mounting board can be connected via a connection member, such as solder.

The joinable surface 441 (451) is formed from an approximately central part of the mounting part 44 (45) in the X-axis direction to the tip of the mounting part 44 (45) (each end of the second conductor 40). The non-joinable surface 442 (452) is formed from the base of the mounting part 44 (45) (the connection part with the conductor side part 41 (42)) to an approximately central part of the mounting part 44 (45) in the X-axis direction. In the present embodiment, the non-joinable surface 442 (452) is thereby formed close to the first conductor 30 than the joinable surface 441 (451).

In the present embodiment, the insulating layer 70 is formed on the entire inner surface of the second conductor 40 along its longitudinal direction, but there is a region where the insulating layer 70 is not formed only at both ends of the outer surface of the second conductor 40 in its longitudinal direction.

As shown in FIG. 2, a first inner bending part 46 bending inward in the X-axis direction (opposite to the first conductor 30 side) is formed near the boundary between the first conductor side part 41 and the first mounting part 44, and a second inner bending part 47 bending inward in the X-axis direction is formed near the boundary between the second conductor side part 42 and the second mounting part 45. The radius of curvature of the outer surface of the inner bending part 46 (47) of the second conductor 40 is smaller than that of the inner surface of the outer bending part 38 (39) of the first conductor 30.

In the manufacture of the coil device 10, the first core 20*a*, the second core 20*b*, the first conductor 30, and the second conductor 40 shown in FIG. 2 are prepared. As the second conductor 40, for example, prepared is a flat wire having an insulating film (insulating layer 70) formed on its surface and machined into the shape shown in FIG. 2. Incidentally, such a flat wire having an insulating film can be formed, for example, by immersing a metal plate into a resin solution.

The joinable surface 441 (451) not including the insulating layer 70 is formed on the mount facing surface 440 (450) of the second conductor 40. The joinable surface 441 (451) is formed by irradiating the above-mentioned flat wire with laser irradiation at a position where the joinable surface 441 (451) should be formed and peeling the insulating layer 70 from the mount facing surface 440 (450). Incidentally, the insulating layer 70 may be peeled off by polishing the surface of the flat wire with a file or so. Preferably, the peeled portion of the insulating layer 70 is soldered by solder dipping or so. This makes it possible to improve the solder wettability of the joinable surfaces 441 and 451. Incidentally, the joinable surfaces 441 and 451 may be formed before or after the flat wire is machined into the shape shown in FIG. 2.

Next, the first conductor 30 and the second conductor 40 are arranged inside the first groove 24*a* (second groove 24*b*) of the first core 20*a* (second core 20*b*) while overlapping with each other. For more detail, the second conductor 40 is disposed so as to surround the first middle leg 23*a* (second middle leg 23*b*), and the first conductor 30 is thereafter disposed so as to surround the second conductor 40 with a predetermined interval. At this time, the first conductor 30 and/or the second conductor 40 may be fixed to the first core 20*a* with an adhesive agent or so.

Incidentally, the inner surface of the first conductor 30 and the outer surface of the second conductor 40 may be joined in advance via the insulating layer 70 (fusion layer) and disposed inside the first groove 24*a* (second groove 24*b*) of the first core 20*a* (second core 20*b*). When the first conductor 30 and the second conductor 40 are integrated via the insulating layer 70, the first core 20*a* (second core 20*b*) is easily disposed inside the first groove 24*a* (second groove 24*b*) of the first core 20*a* (second core 20*b*).

Next, the first core 20*a* (second core 20*b*) is combined with the second core 20*b* (first core 20*a*) so that the first conductor 30 and the second conductor 40 are contained in the second groove 24*b* (first groove 24*a*).

At this time, as shown in FIG. 1B, the first core 20*a* and the second core 20*b* are combined with a predetermined interval in the Y-axis direction so that: the gap G1 is formed between the outer legs 22*a* and 22*b* located on one side in the X-axis direction; the gap G2 is formed between the outer legs 22*a* and 22*b* located on the other side in the X-axis direction; and the gap G3 is formed between the first middle leg 23*a* and the second middle leg 23*b*.

Thus, the outer notch 36 (37) is disposed to face the gap G1 (G2), and the outer bending part 38 (39) is disposed to face the gap G3. After that, the coil device 10 shown in FIG. 1A is obtained by joining the first core 20*a* and the second core 20*b* with an adhesive agent or so.

Figure 1C:
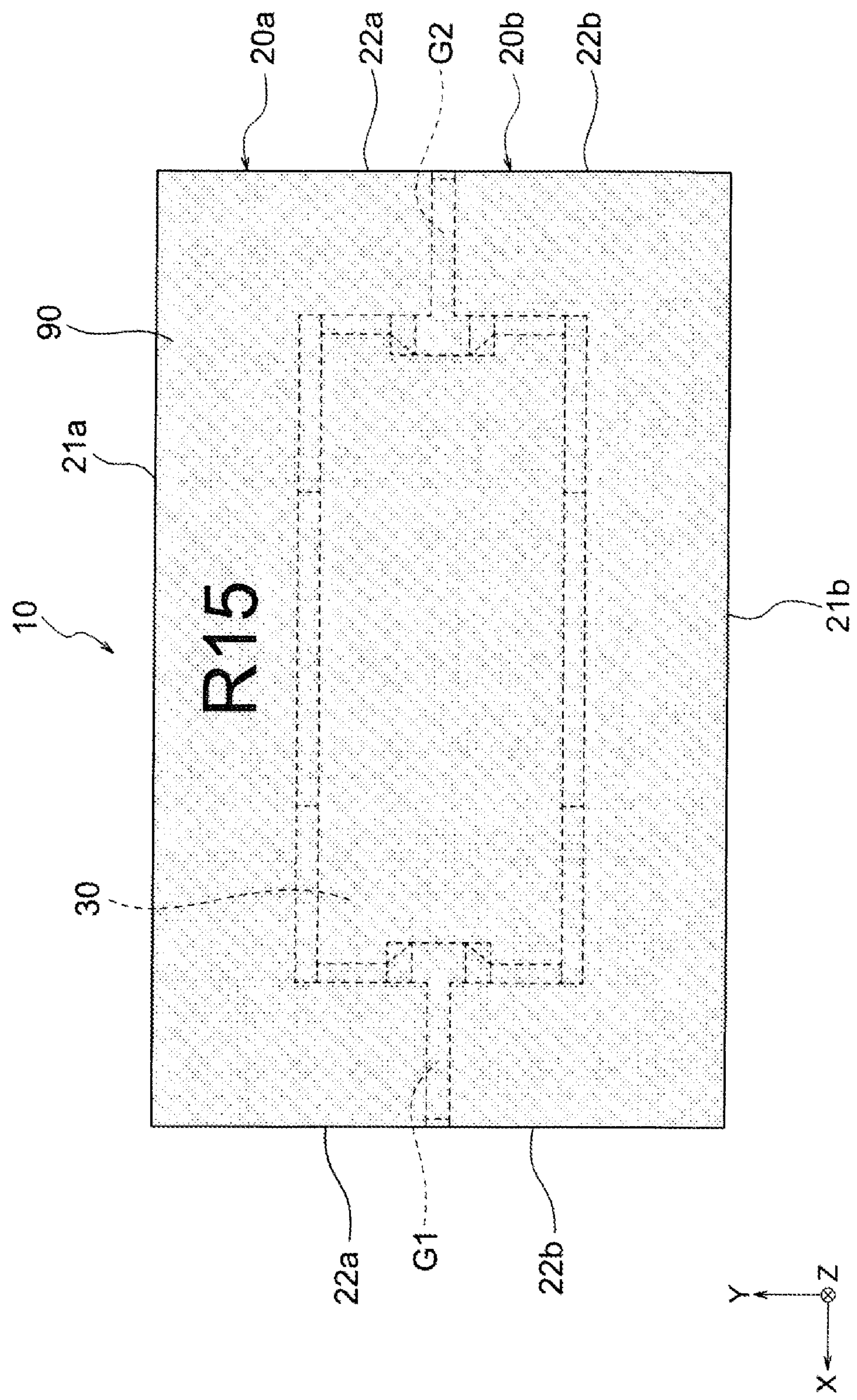
FIG. 1C is a plane view of the coil device shown in FIG. 1A on which a tape member is attached.

After that, as shown in FIG. 1C, a tape member 60 may be attached to the upper surfaces of the cores 20*a* and 20*b* so as to print characters such as a serial number (identifier/character "R15" in the illustrated example) on the surface of the tape member 60. Instead, a tape member 60 on which characters (identifiers) such as a serial number are printed in advance may be attached to the upper surfaces of the cores 20*a* and 20*b*. The tape member 60 is, for example, a Kapton tape and is attached so as to straddle the cores 20*a* and 20*b*. Characters are printed on the tape member 60 by laser irradiation or so. In the prior arts, characters are engraved on the upper surface of the core by laser irradiation, and a tape member is attached so as to cover the characters from above. In this case, however, there is a problem that the characters engraved on the upper surface of the core are difficult to see. Like the present embodiment, when the characters are printed on the tape member attached on the upper surface of the core or when the tape member on which characters are printed is attached to the upper surface of the core, the characters can be seen clearly, and the above-mentioned problem can be prevented effectively As shown in FIG. 2 and FIG. 3, the coil device 10 according to the present embodiment includes the first conductor 30 and the second conductor 40 disposed inside the first conductor 30 and at least partly (the conductor side parts 41 and 42 and the conductor upper part 33) extending along the first conductor 30 (the conductor side parts 31 and 32 and the conductor upper part 33), and the insulating layer 70 is at least formed between the first conductor 30 and the second conductor 40. In this case, the first conductor 30 and the second conductor 40 are arranged while overlapping with each other (double) with a predetermined interval. Under such an arrangement, the magnetic flux can efficiently be transmitted between the first conductor 30 and the second conductor 40, and the magnetic coupling between the first conductor 30 and the second conductor 40 can be increased sufficiently. In addition, since the first conductor 30 and the second conductor 40 are sufficiently insulated via the insulating layer 70 existing therebetween, it is possible to prevent a short-circuit failure generated between the first conductor 30 and the second conductor 40, and the coil device 10 can have a high reliability.

The second conductor 40 according to the present embodiment is made of a flat wire, and the insulating layer 70 is made of an insulating film formed on a surface of the second conductor 40. Since a flat wire with an insulating film is used as the second conductor 40, the insulating layer 70 can exist between the first conductor 30 and the second conductor 40 by simply disposing the second conductor 40 inside the first conductor 30 in an overlapping manner, and the above-mentioned effect can be obtained easily.

In the present embodiment, the insulating layer 70 is formed between the middle leg 23*a* (23*b*) of the core 20*a* (20*b*) and the second conductor 40. Thus, the middle leg 23*a* (23*b*) and the second conductor 40 are insulated sufficiently via the insulating layer 70 existing therebetween. Thus, it is possible to prevent a short-circuit failure generated between the middle leg 23*a* (23*b*) and the second conductor 40, and the coil device 10 can have a high reliability.

The first conductor 30 according to the present embodiment is made of a conductive plate having a plating layer on a surface of the conductive plate. Thus, a connection member, such as solder and conductive adhesive agent, easily adheres to the surface of the first conductor 30, and the first conductor 30 can firmly be connected to the mounting surface 50 of the mounting board. In particular, when the connection member is solder, a solder fillet can easily be formed on the side surface of the first conductor 30, and the first conductor 30 and the mounting surface 50 of the mounting board can thereby firmly be connected.

In the present embodiment, the mount facing surface 440 (450) includes the joinable surface 441 (451) not including the insulating layer 70 and the non-joinable surface 442 (452) including the insulating layer 70, and the non-joinable surface 442 (452) is located closer to the first conductor 30 than the joinable surface 441 (451). In this case, the above-mentioned connection member easily adheres to the joinable surface 441 (451), but does not easily adhere to the non-joinable surface 442 (452). Thus, the non-joinable surface 442 (452) can prevent the connection member adhered to the joinable surface 441 (451) from protruding toward the first conductor 30, and it is possible to effectively prevent a short-circuit failure generated by solder balls or so between the first conductor 30 and the second conductor 40.

In the present embodiment, a radius of curvature of the inner surface of the outer bending part 38 (39) is larger than that of the outer surface of the inner bending part 46 (47) of the second conductor 40. In this case, a bending angle of the inner surface of the outer bending part 38 (39) is smaller than that of the outer surface of the inner bending part 46 (47). Thus, the outer surface of the inner bending part 46 (47) bends sharply near the mounting surface 50 of the mounting board, but the inner surface of the outer bending part 38 (39) bends gently from a position away from the mounting surface 50 of the mounting board. Thus, a comparatively large space is formed between the inner surface of the outer bending part 38 (39) and the outer surface of the inner bending part 46 (47), and it is possible to effectively prevent a short-circuit failure generated between the first conductor 30 and the second conductor 40 in the surroundings of the mounting surface 50. Moreover, even if a land pattern of the mounting board to be connected with the mounting parts 44 and 45 of the second conductor 40 is wide in the X-axis direction, the mounting parts 34 and 35 of the first conductor 30 and the land pattern can be prevented from contacting with each other.

In the present embodiment, a cross-sectional area of the first conductor 30 perpendicular to its extending direction is larger than that of the second conductor 40 perpendicular to its extending direction. Thus, the DC resistance of the first conductor 30 can be smaller than that of the second conductor 40.

In the present embodiment, the insulating coating layer 26 is formed on the bottom surface of the middle leg 23*a* (23*b*) of the core 20*a* (20*b*). Thus, the bottom surface of the middle leg 23*a* (23*b*) and the second conductor 40 can sufficiently be insulated by the insulating coating layer 26.

Second Embodiment

A coil device 110 according to Second Embodiment of the present invention is different from the coil device 10 according to First Embodiment only in the following matters and has structure and effect similar to those of the coil device 10 according to First Embodiment. In the figures, common members with First Embodiment are given common references and are not explained.

Figure 4A:
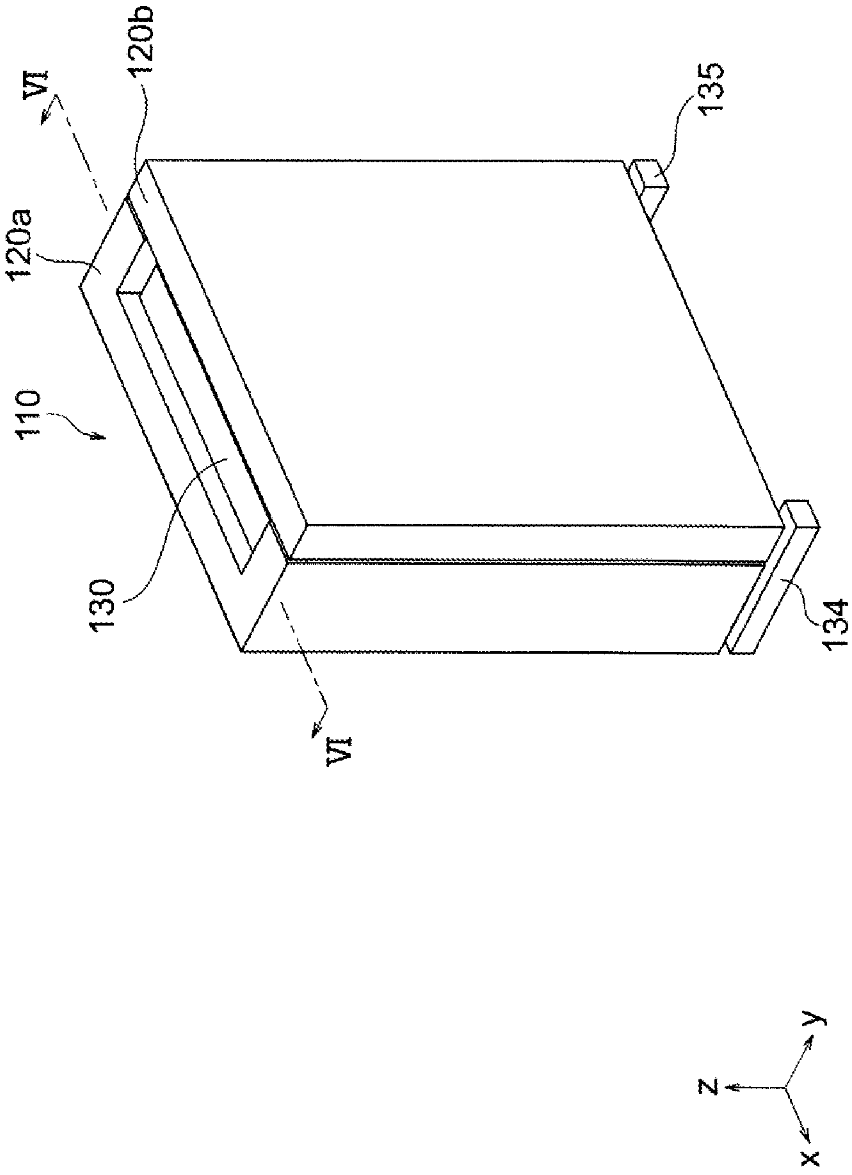
FIG. 4A is a perspective view of a coil device according to Second Embodiment of the present invention.
Figure 5:
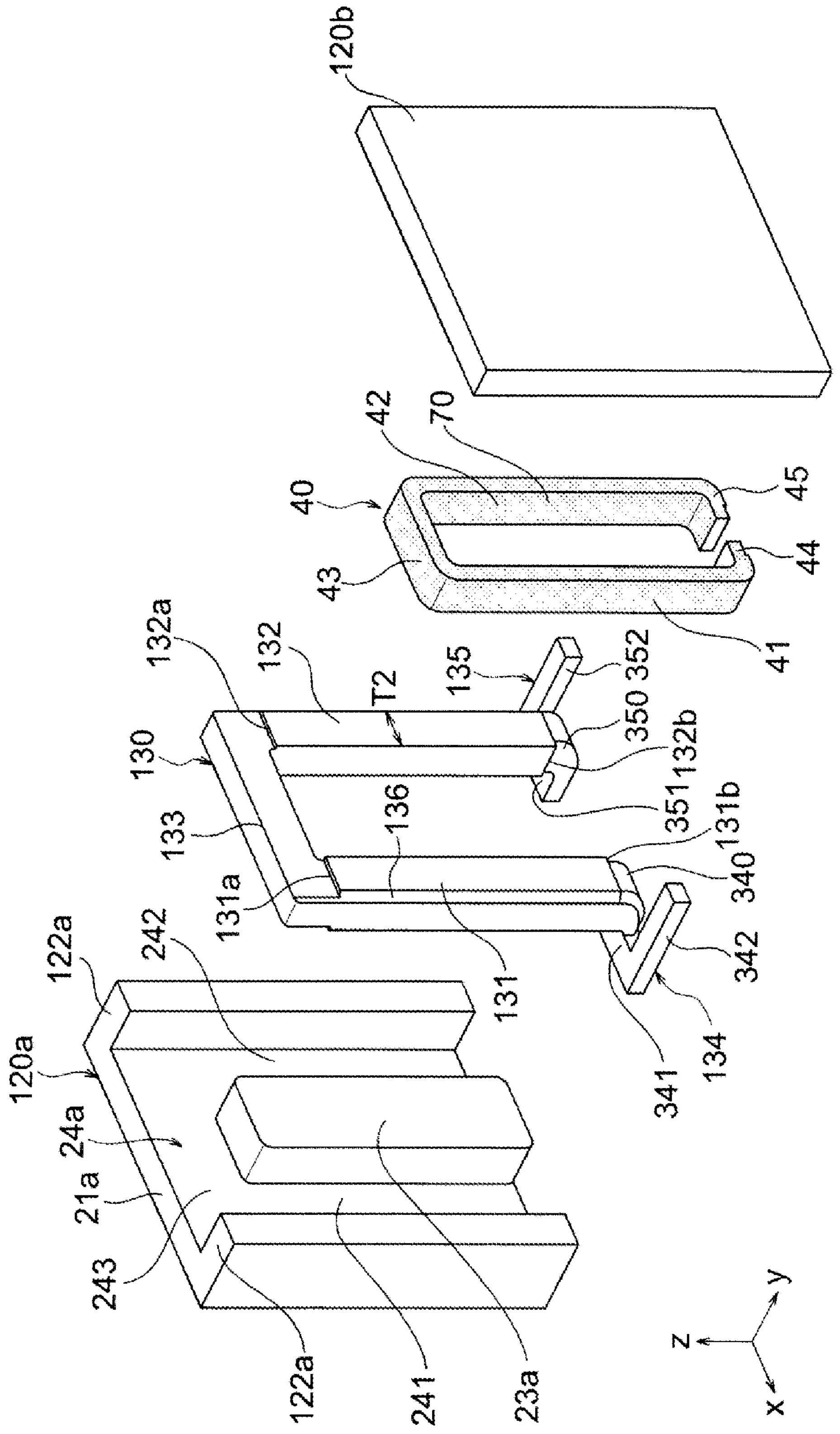
FIG. 5 is an exploded perspective view of the coil device shown in FIG. 4A.

As shown in FIG. 4A and FIG. 5, the coil device 110 includes a first core 120*a*, a second core 120*b*, a first conductor 130, and the second conductor 40. The first core 120*a* is different from the first core 20*a* according to First Embodiment in that the first core 120*a* includes a pair of first outer legs 122*a* and 122*a*, but does not include the side grooves 25*a* and 25*b* shown in FIG. 2. The first outer legs 122*a* and 122*a* are longer in the Z-axis direction by the amount of no arrangement of the side grooves 25*a* and 25*b*.

The second core 120*b* is different from the second core 20*b* according to First Embodiment in that the second core 120*b* has a flat plate shape. When the first core 120*a* and the second core 120*b* are combined, what is called an EI type core is formed.

Figure 4B:
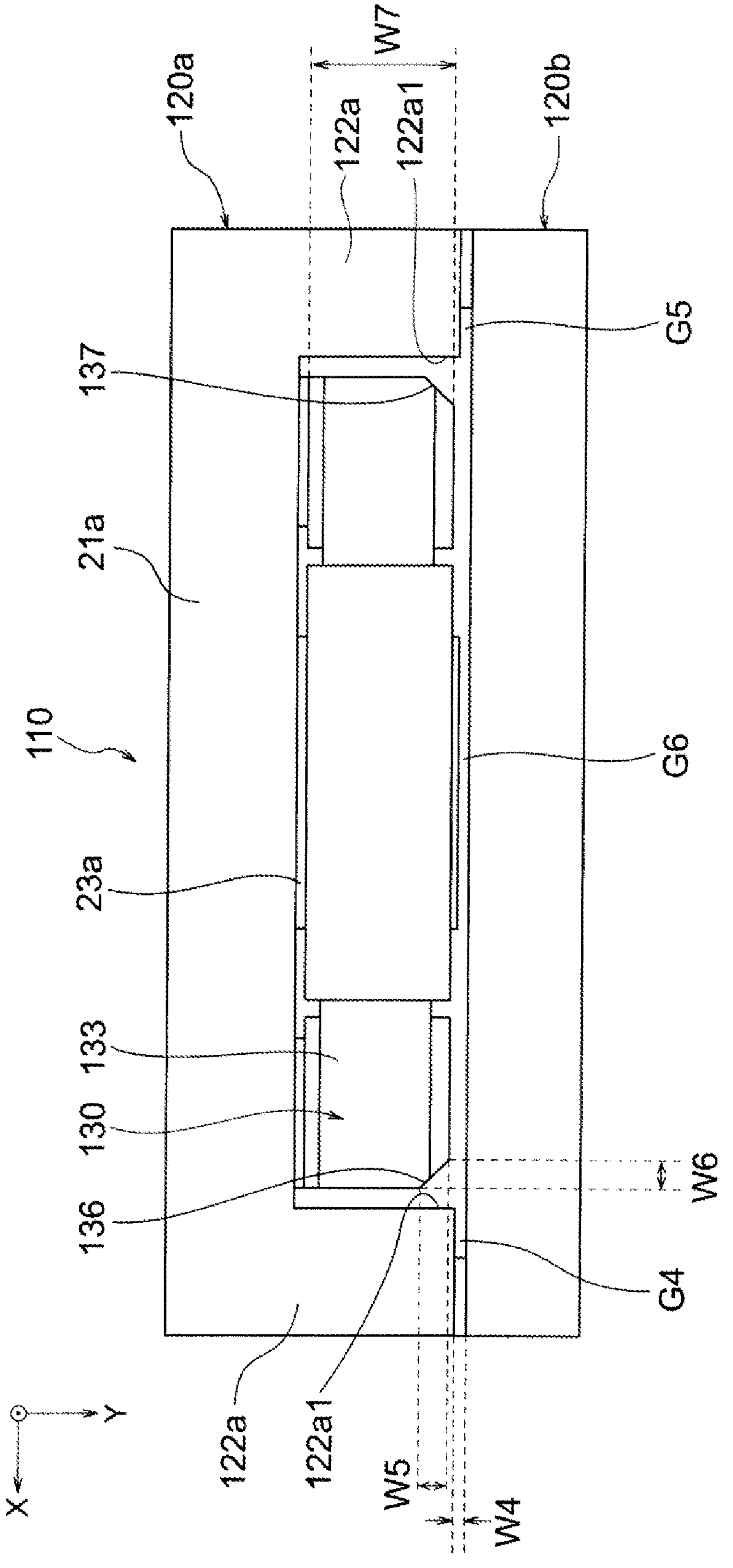
FIG. 4B is a plane view of the coil device shown in FIG. 4A.

As shown in FIG. 4B, a gap G4 is formed between the first outer leg 122*a* located on one side in the X-axis direction and the second core 120*b*, and a gap G5 is formed between the first outer leg 122*a* located on the other side in the X-axis direction and the second core 120*b*. The gap G4 (G5) extends in the Z-axis direction and the X-axis direction along the first outer leg 122*a* (122*a*).

Moreover, a gap G6 is formed between the middle leg 23*a* and the second core 120*b*. The gap G6 extends in the Z-axis direction and the X-axis direction along the middle leg 23*a*.

As shown in FIG. 5, the first conductor 130 includes a first conductor side part 131, a second conductor side part 132, a conductor upper part 133, a first mounting part 134, and a second mounting part 135. Steps 131*a* (132*a*) are formed at the upper end of the conductor side part 131 (132), and a step 131*b* (132*b*) is formed at the lower end of the conductor side part 131 (132). The steps 131*a* (132*a*) are formed on both side surfaces (surfaces parallel to the XZ plane) of the conductor side part 131 (132), and the step 131*b* (132*b*) is formed on the inner surface (surface parallel to the YZ plane) of the conductor side part 131 (132).

The width of the conductor upper part 133 in the Y-axis direction is smaller than that of the first conductor 30 shown in FIG. 2 in the Y-axis direction by the amount of formation of the steps 131*a* and 132*a* at the upper ends of the conductor side parts 131 and 132.

The first mounting part 134 includes a first mounting bending part 340, a first mounting connection part 341, and a first mounting body part 342. The second mounting part 135 includes a second mounting bending part 350, a second mounting connection part 351, and a second mounting body part 352. The mounting bending part 340 (350) is formed continuously (integrally) to the lower end of the conductor side part 131 (132). The mounting bending part 340 (350) bends substantially perpendicularly to the conductor side part 131 (132) and extends toward the first core 120*a* side in the Y-axis direction.

The mounting connection part 341 (351) is formed continuously (integrally) to the end of the mounting bending part 340 (350) and connects the mounting bending part 340 (350) and the mounting body part 342 (352). The mounting connection part 341 (351) extends outward in the X-axis direction.

The mounting body part 342 (352) is formed continuously (integrally) to the end of the mounting connection part 341 (351) and extends toward the second core 120*b* side in the Y-axis direction. The first conductor 130 can be connected to a mounting surface of a mounting board (not shown) via the mounting body parts 342 and 352. The mounting body part 342 (352) is connected to the mounting surface using a connection member, such as solder and conductive adhesive agent.

A first outer notch 136 and a second outer notch 137 are formed on the outer surface of the first conductor 130. The outer notch 136 (137) extends continuously in the extending direction (longitudinal direction) of the conductor side part 131 (132) and the mounting bending part 340 (350). A part (upper end) of the outer notch 136 (137) is also formed at the end of the conductor upper part 133 in the X-axis direction.

As shown in FIG. 4B and FIG. 5, the first outer notch 136 is made of a chamfered portion obtained by chamfering one corners of the conductor upper part 133, the first conductor side part 131, and the first mounting bending part 340 in the Y-axis direction (corners between the outer surfaces and the side surfaces of the conductor upper part 133, the conductor side part 131, and the first mounting bending part 340), and the second outer notch 137 is made of a chamfered portion obtained by chamfering one corners of the conductor upper part 133, the second conductor side part 132, and the second mounting bending part 350 in the Y-axis direction (corners between the outer surfaces and the side surfaces of the conductor upper part 133, the second conductor side part 132, and the second mounting bending part 350). At the positions of the outer notches 136 and 137, an inclined surface (C surface) is formed on each of the conductor upper part 133, the conductor side part 131 (132), and the mounting bending part 340 (350).

The outer notches 136 and 137 are formed on the conductor 130 at positions corresponding to the gaps G4 and G5 (positions close to the gaps G4 and G5). For more detail, the outer notches 136 and 137 are formed in the conductor 130 so as to extend in the Z-axis direction along outer edges 122*a*1 and 122*a*1 of the outer legs 122*a* and 122*a* next to the conductor 130.

The first outer notch 136 diagonally faces the other end of the gap G4 in the X-axis direction. At the position corresponding to the gap G4, the surface of the conductor 130 and the other end of the gap G4 in the Y-axis direction are away from each other by a distance corresponding to a width W5 of the first outer notch 136 in the Y-axis direction or a width W6 of the first outer notch 136 in the X-axis direction. The second outer notch 137 diagonally faces one end of the gap G5 in the X-axis direction. At the position corresponding to the gap G5, the surface of the conductor 130 and one end of the gap G5 in the Y-axis direction are away from each other by a distance corresponding to a width of the second outer notch 137 in the Y-axis direction or a width of the second outer notch 137 in the X-axis direction.

Preferably, the width of the outer notch 136 (137) in the Y-axis direction is larger than that of the gap G4 (G5) in the Y-axis direction, but may not be larger than that of the gap G4 (G5) in the Y-axis direction. The ratio W5/W4 of the width W5 of the first outer notch 136 in the Y-axis direction to the width W4 of the gap G4 in the Y-axis direction is preferably 0.5-6, more preferably 1-5, still more preferably 2-4. This is also the case with the ratio of the width of the second outer notch 137 in the Y-axis direction to the width of the gap G5 in the Z-axis direction.

Preferably, the width of the outer notch 136 (137) in the X-axis direction is larger than that of the gap G4 (G5) in the Y-axis direction, but may not be larger than that of the gap G4 (G5) in the Y-axis direction. The ratio W6/W4 of the width W6 of the first outer notch 136 in the X-axis direction to the width W4 of the gap G4 in the Y-axis direction is preferably 0.5-6, more preferably 1-5, still more preferably 2-4. This is also the case with the ratio of the width of the second outer notch 137 in the X-axis direction to the width of the gap G5 in the Y-axis direction.

The ratio W5/W7 of the width W5 of the first outer notch 136 in the Y-axis direction to the width W7 of the conductor 130 in the Y-axis direction is preferably 0.1-0.5, more preferably 0.2-0.3. This is also the case with the ratio of the width of the second outer notch 137 in the Y-axis direction to the width W7 of the conductor 130 in the Y-axis direction.

The ratio W6/T2 of the width W6 of the first outer notch 136 in the X-axis direction to the thickness T2 of the conductor 130 (FIG. 5) is preferably 0.1-0.9, more preferably 0.3-0.7. This is also the case with the ratio of the width of the second outer notch 137 in the X-axis direction to the thickness T2 of the conductor 130.

In the present embodiment, at the positions corresponding to the gaps G4 and G5, the leakage magnetic flux generated in the gaps G4 and G5 can be prevented from hitting the conductor upper part 133 by determining each value of W5/W4, W6/W4, W5/W7 and W6/T2 as mentioned above or satisfying W5>W4 or W6>W4.

In the present embodiment, effects similar to those of First Embodiment are also obtained. In the present embodiment, the size of the mounting part 134 (135) (particularly, the size of the mounting body part 342 (352)) is smaller than that of the mounting part 34 (35) according to First Embodiment, and the coil device 110 can thereby be downsized.

Figure 6:
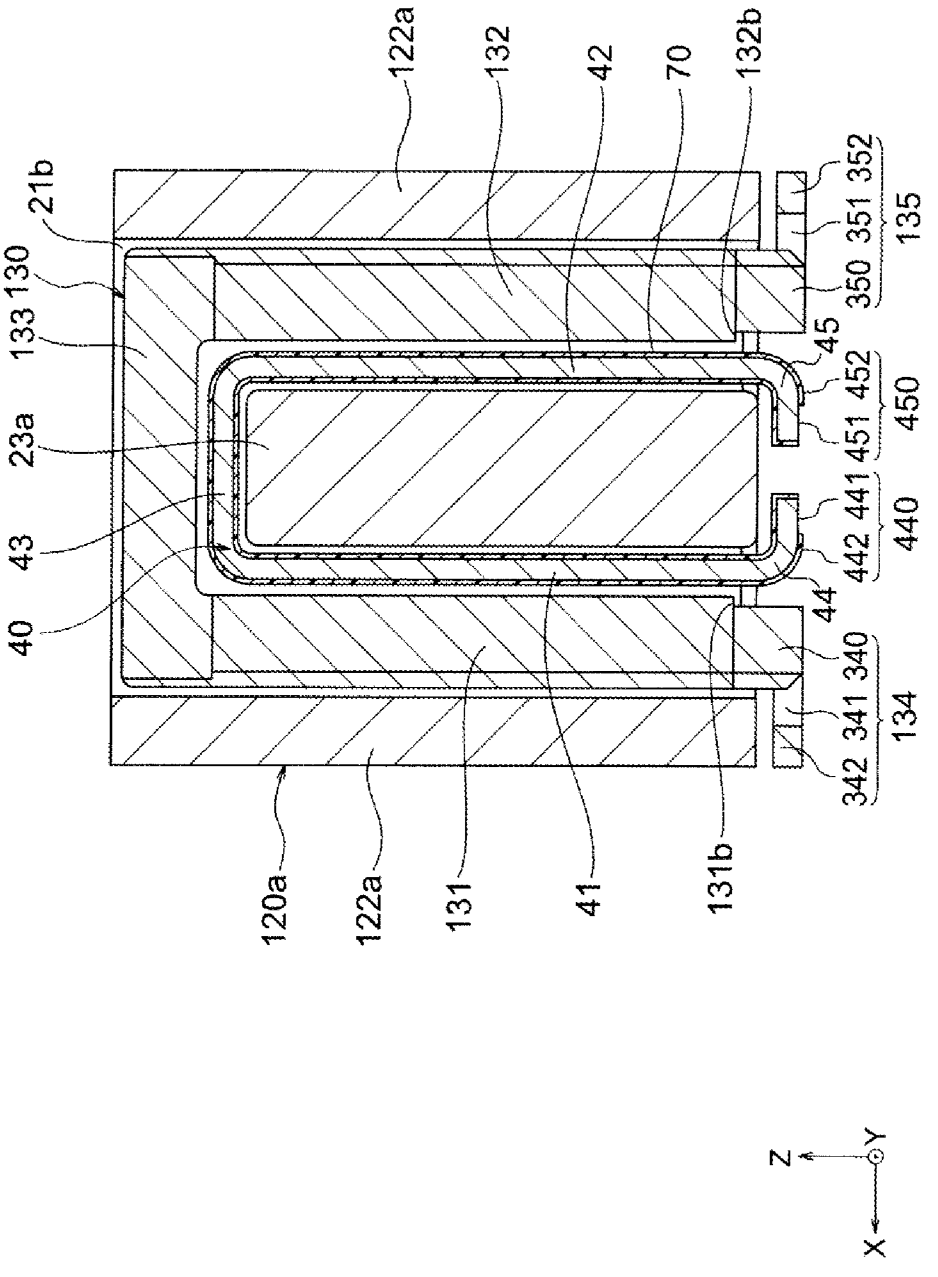
FIG. 6 is a cross-sectional view of the coil device shown in FIG. 4A along the VI-VI line.

In the present embodiment, since the step 131*b* (132*b*) is formed at the lower end of the conductor side part 131 (132) as shown in FIG. 6, a space is formed between the mounting part 134 (135) (mounting bending part 340 (350)) of the first conductor 130 and the mounting part 44 (45) of the second conductor 40 by the amount of the step 131*b* (132*b*), and it is possible to effectively prevent a short-circuit failure generated between the first conductor 130 and the second conductor 40 in the surroundings of the mounting surface of the mounting board (not shown).

Third Embodiment

A coil device 210 according to Third Embodiment of the present invention is different from the coil device 10 according to First Embodiment only in the following matters and has structure and effect similar to those of the coil device 10 according to First Embodiment. In the figures, common members with First Embodiment and Second Embodiment are given common references and are not explained.

Figure 7:
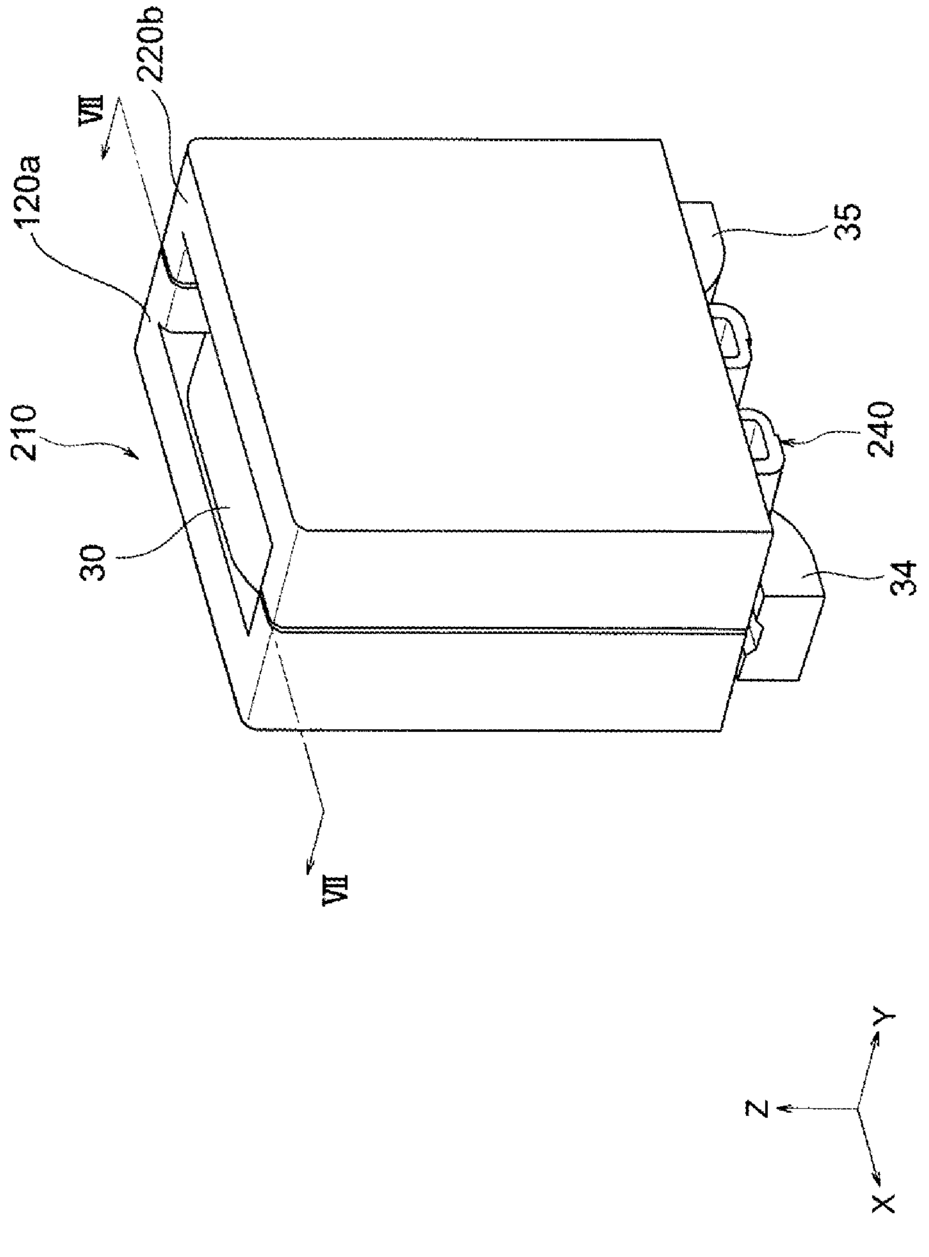
FIG. 7 is a perspective view of a coil device according to Third Embodiment of the present invention.

As shown in FIG. 7, the coil device 210 includes the first core 120*a*, a second core 220*b*, the first conductor 30, and a second conductor 240. The second core 220*b* has a similar shape to the first core 120*a*.

Figure 8:
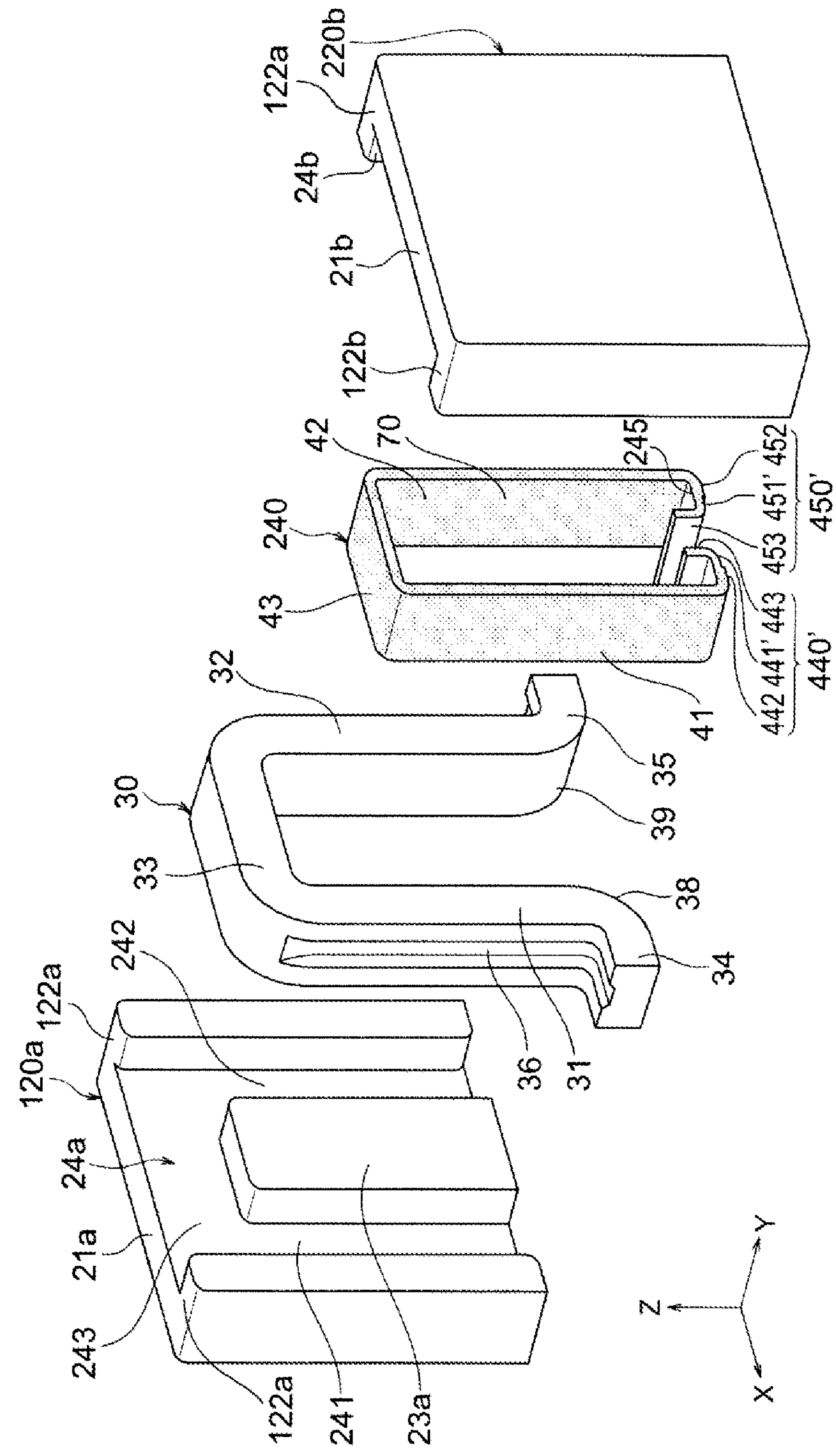
FIG. 8 is an exploded perspective view of the coil device shown in FIG. 7.
Figure 9:
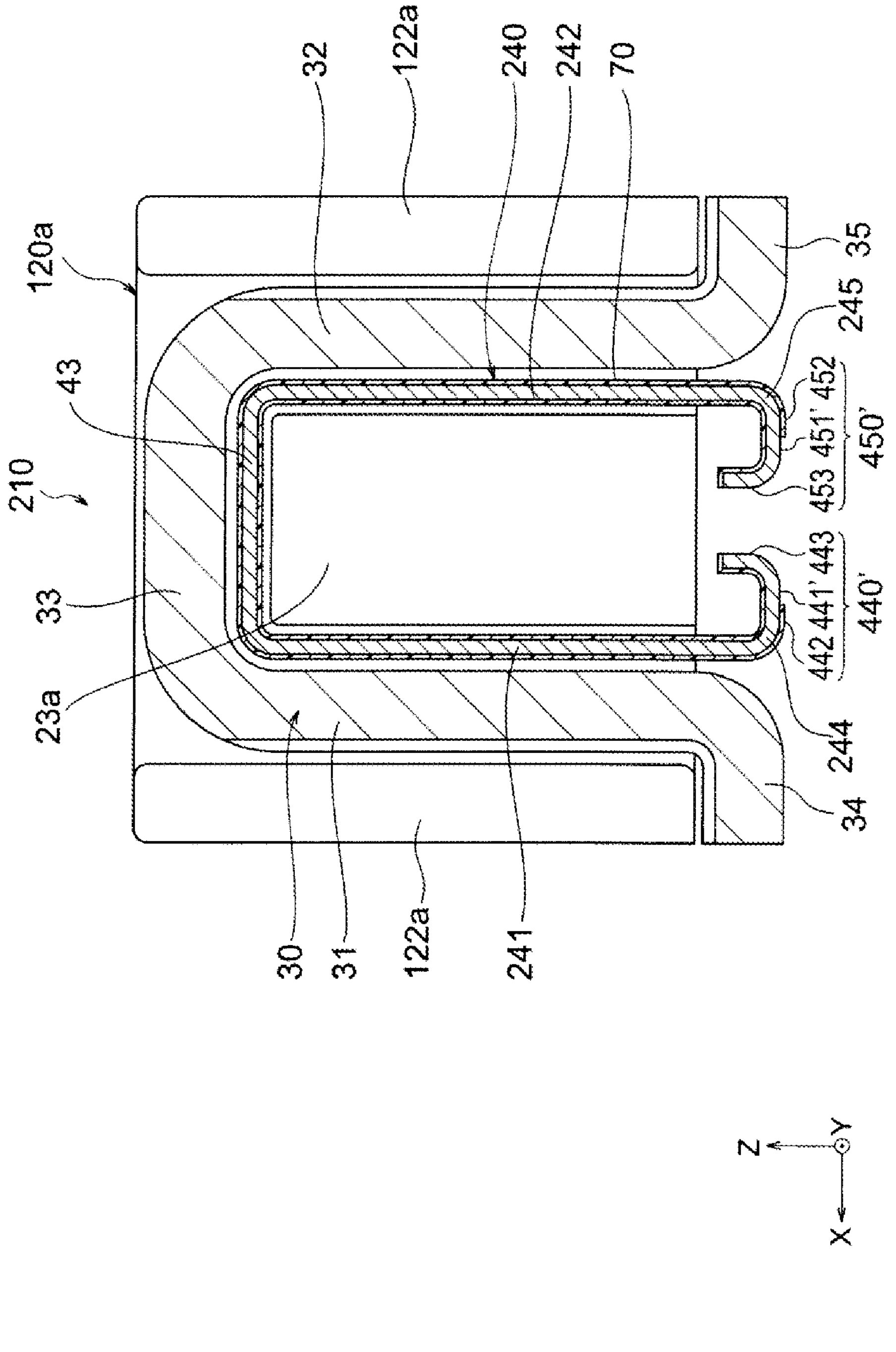
FIG. 9 is a cross-sectional view of the coil device shown in FIG. 7 along the VII-VII line.

As shown in FIG. 8, the second conductor 240 includes a first mounting part 244 and a second mounting part 245. The ends of the mounting parts 244 and 245 (each end of the second conductor 240) stand upward. As shown in FIG. 9, the end surface of the mounting part 244 (245) is disposed with a predetermined interval to the bottom surfaces of the middle legs 23*a* and 23*b* of the cores 120*a* and 220*b* in the Z-axis direction.

The first mounting part 244 includes a first mount facing surface 440', and the second mounting part 245 includes a second mount facing surface 450'. The first mount facing surface 440' includes a first standing part 443 standing from a mounting surface of a mounting board (not shown), and the second mount facing surface 450' includes a second standing part 453 standing from a mounting surface of a mounting board (not shown). The standing part 443 (453) stands from the mounting surface of the mounting board at a half-way position of a joinable surface 441' (451') in the X-axis direction.

In the present embodiment, effects similar to those of First Embodiment can also be obtained, and the mount facing surface 440' (450') includes the standing part 443 (453). Thus, a connection member can be attached not only to an opposite surface to the mounting surface of the mounting board, but also to the standing part 443 (453) of the mounting part 244 (245). Thus, when the connection member is solder, a solder fillet can be formed on the standing part 443 (453), and the second conductor 240 can firmly be connected to the mounting surface of the mounting board. Moreover, it is possible to prevent a short-circuit failure generated between the mounting parts 244 and 245 due to formation of, for example, solder balls on the mounting parts 244 and 245 of the second conductor.

In the present embodiment, the bottom surfaces of the cores 120*a* and 220*b* are arranged separately from the mounting surface of the mounting board (not shown). For more detail, as shown in FIG. 7, the bottom surfaces of the cores 120*a* and 120*b* are arranged separately from the bottom surfaces of the mounting parts 34 and 35 to be connected with the mounting surface of the mounting board by a distance equal to or larger than the thickness of the first conductor 30. In the present embodiment, it is thereby possible to sufficiently secure the insulation between the bottom surfaces of the cores 120*a* and 220*b* and the mounting surface of the mounting board. In particularly, when the cores 120*a* and 220*b* are made of a metal magnetic material or so, it is possible to effectively prevent a short-circuit failure generated between the bottom surfaces of the cores 120*a* and 220*b* and the mounting surface.

Fourth Embodiment

A coil device 310 according to Fourth Embodiment of the present invention is different from the coil device 10 according to First Embodiment only in the following matters and has structure and effect similar to those of the coil device 10 according to First Embodiment. In the figures, common members with First Embodiment to Third Embodiment are given common references and are not explained.

Figure 10:
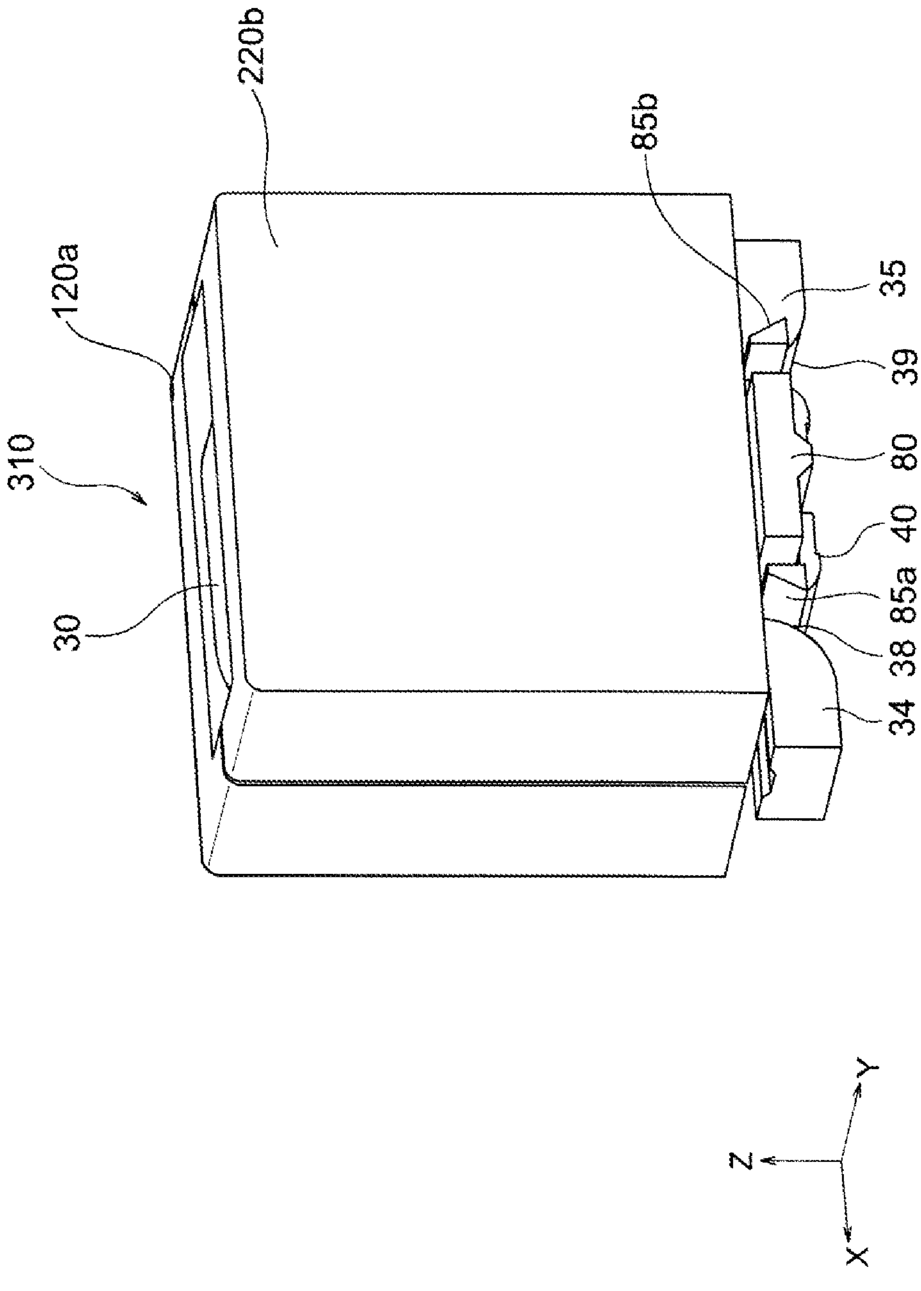
FIG. 10 is a perspective view of a coil device according to Fourth Embodiment of the present invention.

As shown in FIG. 10, the coil device 310 includes a first core 120*a*, a second core 220*b*, the first conductor 30, the second conductor 40, and a resin spacer 80. The resin spacer 80 is disposed below the cores 120*a* and 220*b* and fixed so as to straddle the first conductor 30 and the second conductor 40. The resin spacer 80 mainly favorably insulates the first conductor 30 and the second conductor 40.

Figure 11:
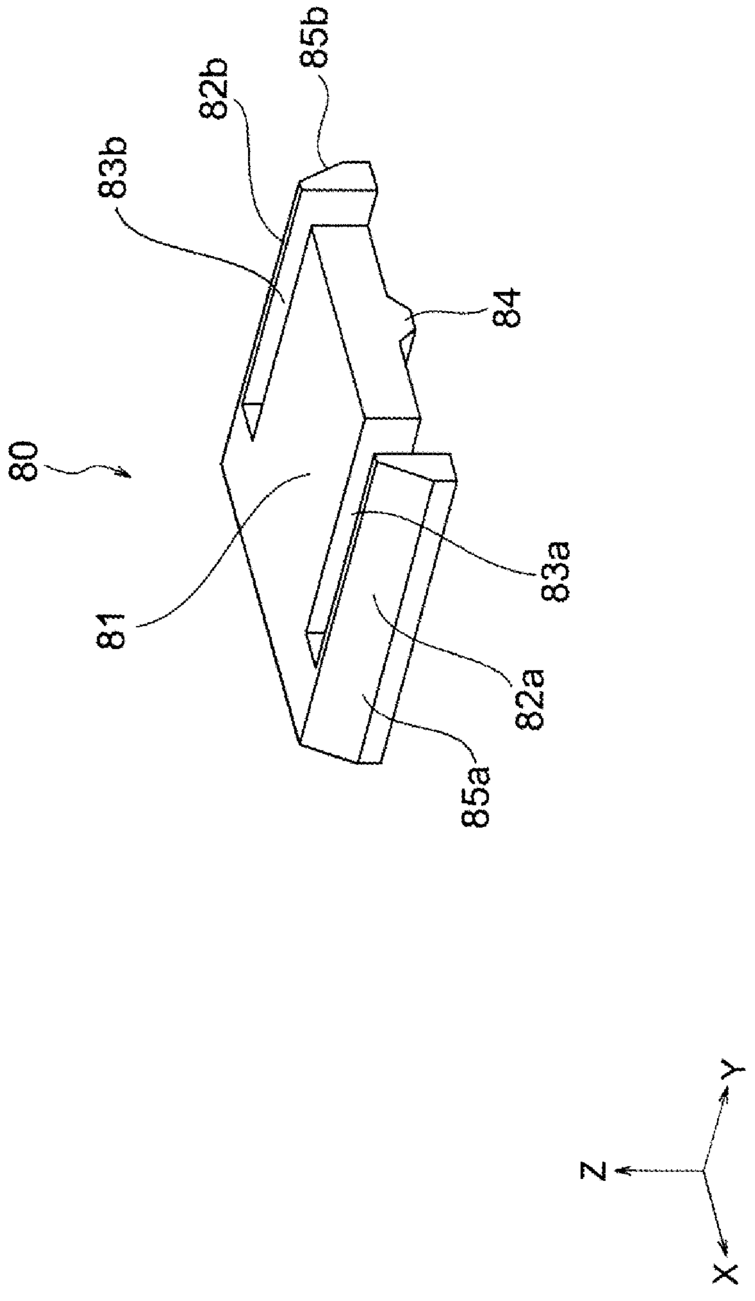
FIG. 11 is a perspective view of a resin spacer shown in FIG. 10.
Figure 12:
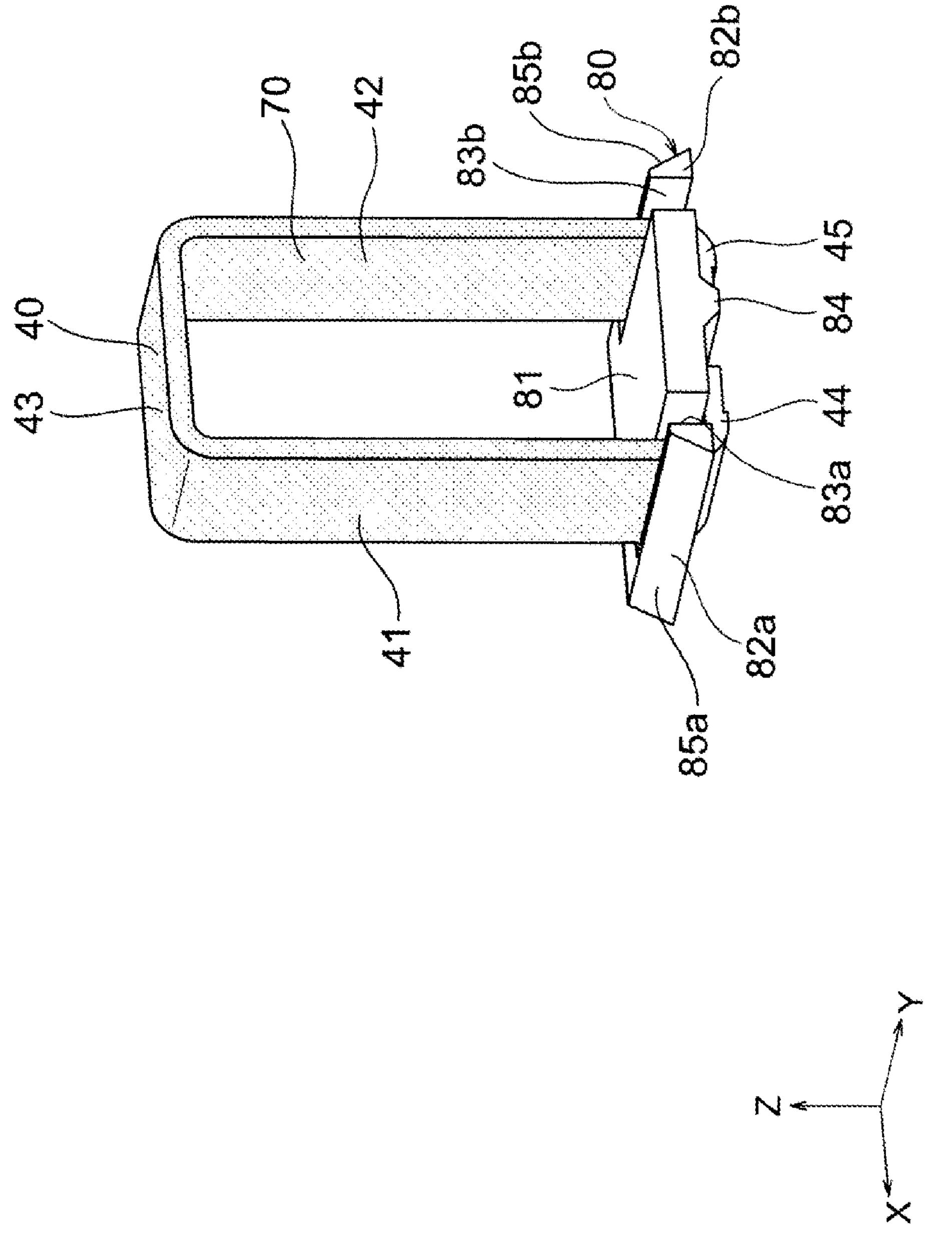
FIG. 12 is a perspective view of the resin spacer shown in FIG. 11 to which a second conductor is attached.

As shown in FIG. 11 and FIG. 12, the resin spacer 80 includes a base part 81, a first side insulating part 82*a*, a second side insulating part 82*b*, a first groove part 83*a*, a second groove part 83*b*, and a protrusion part 84.

The base part 81 has a flat plate shape. The base part 81 is disposed above the first mounting part 44 and the second mounting part 45 and fixed so as to be sandwiched by the lower ends of the first conductor side part 41 and the second conductor side part 42 of the second conductor 40.

The protrusion part 84 extending in the Y-axis direction is formed at an approximately central part of the base part 81 in the X-axis direction. The protrusion part 84 is disposed in the space formed between the mounting parts 44 and 45 of the second conductor 40. The downward protrusion width of the protrusion part 84 is substantially equal to the thickness (plate thickness) of the mounting part 44 (45). The protrusion part 84 can divide the mounting parts 44 and 45 in the X-axis direction. When the second conductor 40 is connected to a mounting surface of a mounting board (not shown) via a connection member, such as solder, the protrusion part 84 prevents a phenomenon (solder bridge) where the mounting parts 44 and 45 are connected by the connection member (solder balls).

The first groove part 83*a* is formed between the base part 81 and the first side insulating part 82*a*, and the second groove part 83*b* is formed between the base part 81 and the second side insulating part 82*b*. The groove part 83*a* (83*b*) extends in the Y-axis direction. One end of the groove part 83*a* (83*b*) in the Y-axis direction is closed, but the other end of the groove part 83*a* (83*b*) in the Y-axis direction is open. The lower end of the conductor side part 41 (42) of the second conductor 40 can be inserted into the groove part 83*a* (83*b*) via the other end of the groove part 83*a* (83*b*) in the Y-axis direction.

The first side insulating part 82*a* is disposed on one side of the base part 81 in the X-axis direction across the first groove part 83*a*. The second side insulating part 82*b* is disposed on the other side of the base part 81 in the X-axis direction across the second groove part 83*b*. The side insulating part 82*a* (82*b*) extends in the Y-axis direction and has a width in the Y-axis direction similar to that of the base part 81. A first inclined part 85*a* is formed on the upper surface of the first side insulating part 82*a*, and a second inclined part 85*b* is formed on the upper surface of the second side insulating part 82*b*.

The first side insulating part 82*a* is disposed between the first mounting part 34 of the first conductor 30 (FIG. 10) and the first conductor side part 41 of the second conductor 40. At this time, the first inclined part 85*a* is disposed along the shape of the first outer bending part 38 of the first conductor 30.

The second side insulating part 82*b* is disposed between the second mounting part 35 of the first conductor 30 (FIG. 10) and the second conductor side part 42 of the second conductor 40. At this time, the second inclined part 85*b* is disposed along the shape of the second outer bending part 39 of the first conductor 30.

When the conductors 30 and 40 are connected to the mounting surface of the mounting board (not shown) via a connection member, such as solder, the side insulating part 82*a* (82*b*) prevents a phenomenon (solder bridge) where the mounting part 34 (35) of the first conductor 30 and the mounting part 44 (45) of the second conductor 40 are connected by the connection member.

In the present embodiment, effects similar to those of First Embodiment are also obtained. In the present embodiment, the mounting part 34 (35) of the first conductor 30 and the mounting part 44 (45) of the second conductor 40 are insulated by the resin spacer 80. Thus, it is possible to effectively prevent a short-circuit failure generated between the first mounting part 34 (35) and the second mounting part 44 (45).

Incidentally, the present invention is not limited to the above-mentioned embodiments and can variously be modified within the scope of the present invention.

In First Embodiment, the first conductor 30 and the second conductor 40 are insulated by the insulating layer 70 formed on the surface of the second conductor 40, but the first conductor 30 and the second conductor 40 may be insulated by forming the insulating layer 70 on the surface of the first conductor 30 (particularly, the inner surface of the first conductor 30). The insulating layer 70 may be formed on both of the surface of the second conductor 40 and the inner surface of the first conductor 30. This is also the case with Second Embodiment to Fourth Embodiment.

In First Embodiment, the second conductor 40 and the middle legs 23*a* and 23*b* of the cores 20*a* and 20*b* are insulated by the insulating layer 70 formed on the surface of the second conductor 40, but the first conductor 30 and the outer legs 22*a* and 22*b* of the cores 20*a* and 20*b* may be insulated by forming the insulating layer 70 on the surface of the first conductor 30 (particularly, the outer surface of the first conductor 30). Instead, the second conductor 40 and the middle legs 23*a* and 23*b* of the cores 20*a* and 20*b* may be insulated by forming the insulating layer 70 on the outer circumferential surfaces of the middle legs 23*a* and 23*b* of the cores 20*a* and 20*b* (insulation coating is subjected to the middle legs 23*a* and 23*b*), and the first conductor 30 and the outer legs 22*a* and 22*b* of the cores 20*a* and 20*b* may be insulated by forming the insulating layer 70 on the outer circumferential surfaces of the outer legs 22*a* and 22*b* of the cores 20*a* and 20*b*. This is also the case with Second Embodiment to Fourth Embodiment.

In First Embodiment, the insulating layer 70 is formed continuously along the outer surface or the inner surface of the second conductor 40, but may be formed intermittently along the outer surface or the inner surface of the second conductor 40. This is also the case with Second Embodiment to Fourth Embodiment.

In First Embodiment, the first core 20*a* and the second core 20*b* are formed separately, but may be formed integrally. This is also the case with Second Embodiment to Fourth Embodiment.

In First Embodiment, a radius of curvature of the outer surface of the inner bending part 46 (47) of the second conductor 40 is smaller than that of the inner surface of the outer bending part 38 (39) of the first conductor 30, but a radius of curvature of the outer surface of the inner bending part 46 (47) of the second conductor 40 may be larger than that of the inner surface of the outer bending part 38 (39) of the first conductor 30. In this case, similar effects are also obtained. This is also the case with Second Embodiment to Fourth Embodiment.

In each of the above-mentioned embodiments, the insulating layer 70 extends continuously along the inner surface or the outer surface of the second conductor 40, but may extend intermittently along the inner surface or the outer surface of the second conductor 40.

In First Embodiment, as shown in FIG. 3, the insulating coating layer 26 is formed on the bottom surfaces of the middle legs 23*a* and 23*b*, but the insulating coating layer 26 may be formed at any other position. For example, the insulating coating layer 26 may be formed on the entire core 20*a* (20*b*). Instead, the insulating coating layer 26 may be formed on the bottom surfaces of the outer legs 22*a* and 22*b*. In this case, it is possible to favorably insulate the bottom surface of the outer leg 22*a* (22*b*) and the mounting part 34 (35) of the first conductor 30. The bottom surface of the base part 21*a* (21*b*) and the mounting surface of the mounting board can be insulated favorably by forming the insulating coating layer 26 on the bottom surface of the base part 21*a* (21*b*).

DESCRIPTION OF THE REFERENCE NUMERICAL

10, 110, 210, 310 . . . coil device
20*a*, 120*a* . . . first core
20*b*, 120*b*, 220*b* . . . second core
21*a* . . . first base
21*b* . . . second base
22*a*, 122*a* . . . first outer leg
22*a*1, 122*a*1 . . . first outer leg edge
22*b* . . . second outer leg
22*b*1 . . . second outer leg edge
23*a* . . . first middle leg
23*b* . . . second middle leg
24*a* . . . first groove
24*b* . . . second groove
241 . . . first side part
242 . . . second side part
243 . . . upper part
25*a* . . . first side groove
25*b* . . . second side groove
26 . . . insulating coating layer
30, 130 . . . first conductor
31, 131 . . . first conductor side part
32, 132 . . . second conductor side part
33, 133 . . . conductor upper part
34, 134 . . . first mounting part
340 . . . first mounting bending part
341 . . . first mounting connection part
343 . . . first mounting body part
35, 135 . . . second mounting part
350 . . . second mounting bending part
351 . . . second mounting connection part
353 . . . second mounting body part
36, 136 . . . first outer notch
37, 137 . . . second outer notch
38 . . . first outer bending part
39 . . . second outer bending part
40, 240 . . . second conductor
41 . . . first conductor side part
42 . . . second conductor side part
43 . . . conductor upper part
44, 244 . . . first mounting part
440, 440' . . . mount facing surface

441, 441' . . . joinable surface
442 . . . non-joinable surface
443 . . . standing part
45, 245 . . . second mounting part
450, 450' . . . mount facing surface
451, 451' . . . joinable surface
452 . . . non-joinable surface
453 . . . standing part
46 . . . first inner bending part
47 . . . second inner bending part
50 . . . mounting surface of mounting board
60 . . . tape member
70 . . . insulating layer
80 . . . resin spacer

What is claimed is:

1. A coil device comprising:

a first conductor including (1) a first body having a U-shape as viewed from a first direction and (2) first mounting parts continuous to ends of the first body and configured to be connected to a mounting substrate;

a second conductor including (1) a second body having the U-shape as viewed from the first direction and disposed inside the first body so as to face an inner surface of the first body and (2) second mounting parts continuous to ends of the second body and configured to be connected to the mounting substrate; and a core for internally arranging the first body and the second body, wherein an insulating layer is formed at least between the inner surface of the first body and an outer surface of the second body, the first mounting parts at least partially extend apart from each other as viewed from the first direction, the second mounting parts at least partially extend so as to approach each other as viewed from the first direction, and outer surfaces of the first mounting parts and the second mounting parts are configured to be disposed parallel to the mounting substrate.

2. The coil device according to claim 1, wherein the second conductor is made of a flat wire, and the insulating layer is made of an insulating film formed on a surface of the second conductor.

3. The coil device according to claim 2, wherein the first conductor and the second conductor are adhered via a fusion layer formed by fusing the insulating layer formed on the surface of the second conductor.

4. The coil device according to claim 1, wherein the first conductor and the second conductor are adhered via a fusion layer formed by fusing the insulating layer formed on a surface of the second conductor.

5. The coil device according to claim 1, wherein the insulating layer is formed between the core and the first conductor or the second conductor.

6. The coil device according to claim 1, wherein the first conductor is made of a conductive plate with a plating layer formed on a surface of the conductive plate.

7. The coil device according to claim 1, wherein the second conductor includes a mount facing surface capable of facing the mounting substrate, the mount facing surface consists of a joinable surface not including the insulating layer and a non-joinable surface including the insulating layer, and the non-joinable surface is located closer to the first conductor than the joinable surface.

8. The coil device according to claim 7, wherein the joinable surface includes a standing part standing from the mounting substrate.

9. The coil device according to claim 1, wherein an outer bending part bending outward is provided at an end of the first conductor, an inner bending part bending inward is provided at an end of the second conductor, and a radius of curvature of an inner surface of the outer bending part is larger than that of an outer surface of the inner bending part.

10. The coil device according to claim 1, wherein a cross-sectional area of the first conductor perpendicular to its extending direction is larger than that of the second conductor perpendicular to its extending direction.

11. The coil device according to claim 1, wherein a bottom surface of the core is disposed away from the mounting substrate.

12. The coil device according to claim 1, wherein an insulating coating layer is provided at least on a bottom surface of the core.

13. The coil device according to claim 1, wherein the first mounting parts and the second mounting parts are insulated by a resin spacer.

14. The coil device according to claim 1, wherein the core has a first core and a second core combined with the first core, a gap is formed between the first core and the second core, and an outer surface of the first body is provided with a notch extending along the gap at a position corresponding to the gap.

* * * * *